US010183832B2

(12) United States Patent
Ogasawara

(10) Patent No.: US 10,183,832 B2
(45) Date of Patent: Jan. 22, 2019

(54) IMAGE FORMING APPARATUS AND SORTING METHOD

(71) Applicant: KYOCERA Document Solutions Inc., Osaka (JP)

(72) Inventor: Hideyuki Ogasawara, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 127 days.

(21) Appl. No.: 15/055,587

(22) Filed: Feb. 27, 2016

(65) Prior Publication Data

US 2016/0251192 A1 Sep. 1, 2016

(30) Foreign Application Priority Data

Feb. 27, 2015 (JP) .................. 2015-038213

(51) Int. Cl.
B65H 39/11 (2006.01)
B65H 31/24 (2006.01)
G06K 15/00 (2006.01)

(52) U.S. Cl.
CPC ............. *B65H 39/11* (2013.01); *B65H 31/24* (2013.01); *G06K 15/403* (2013.01); *B65H 2301/141* (2013.01); *B65H 2301/1421* (2013.01); *B65H 2405/332* (2013.01); *B65H 2408/113* (2013.01); *B65H 2511/11* (2013.01); *B65H 2511/13* (2013.01); *B65H 2801/06* (2013.01)

(58) Field of Classification Search
CPC ...... B65H 2301/141; B65H 2301/1421; B65H 2405/332
See application file for complete search history.

(56) References Cited

U.S. PATENT DOCUMENTS

| 2003/0184010 | A1* | 10/2003 | Kato | B65H 29/51 271/207 |
| 2006/0044601 | A1* | 3/2006 | Misawa | G06F 3/122 358/1.15 |
| 2008/0122165 | A1* | 5/2008 | Shirasaki | B65H 29/14 271/220 |
| 2012/0001377 | A1* | 1/2012 | Miyahara | B65H 3/44 271/9.06 |
| 2016/0122148 | A1* | 5/2016 | Westcott | B65H 31/24 358/488 |

FOREIGN PATENT DOCUMENTS

| JP | 2005-62264 A | 3/2005 |
| JP | 2010-089879 A | 4/2010 |

* cited by examiner

Primary Examiner — Jennifer Simmons
(74) Attorney, Agent, or Firm — Hawaii Patent Services; Nathaniel K. Fedde; Kenton N. Fedde

(57) ABSTRACT

Provided is an image forming apparatus and a sorting method allowing paper sheets to be sorted by size or thickness from a bundle of documents that have been already printed with no need for adding a sensor, or the like, or during the time for printing preparation, or the like. The image forming apparatus includes a first detecting part, a paper discharging part and a control part. The first detecting part detects the pass of an edge part of the document. The control part determines the length of a document along the direction of conveyance from the time required from the moment when the document reaches the first detecting part to the moment when it pass the first detecting part, determining the sorting destination.

2 Claims, 30 Drawing Sheets

FIG.3B

| DOC. | SIZE AND DIREC. | W | L |
|---|---|---|---|
| Da-1 | A3 LONGITUDINAL | 297 | 420 |
| Da-2 | A3 LONGITUDINAL | 297 | 420 |
| Da-3 | A4 LATERAL | 297 | 210 |
| Da-4 | A3 LONGITUDINAL | 297 | 420 |
| Da-5 | A4 LATERAL | 297 | 210 |
| Da-6 | A3 LONGITUDINAL | 297 | 420 |
| Da-7 | A3 LONGITUDINAL | 297 | 420 |
| Da-8 | A4 LATERAL | 297 | 210 |
| Da-9 | A4 LATERAL | 297 | 210 |
| Da-10 | A3 LONGITUDINAL | 297 | 420 |

FIG.4

| LOGICAL ADDRESS (AREA) | 113:MEMORY DATA (CONTENTS) | | |
|---|---|---|---|
| x000 ⋮ x009 | PROGRAM AREA (113a) | | |
| x010 ⋮ x019 | VARIOUS SETTING INFORMATION AREA (113b) | | |
| x020 ⋮ x029 | IMAGE DATA AREA (113c) | | |
| x030 ⋮ x039 | SORTING DESTINATION INFORMATION AREA (113d) (LENGTH 113d-1 TO LENGTH 113d-10) | LENGTH 113d-1 (DISCHARGE TRAY 208-1) | 420 |
| | | LENGTH 113d-2 (DISCHARGE TRAY 208-2) | X |
| | | LENGTH 113d-3 (DISCHARGE TRAY 208-3) | □□□ |
| | | LENGTH 113d-4 (DISCHARGE TRAY 208-4) | □□□ |
| | | LENGTH 113d-5 (DISCHARGE TRAY 208-5) | □□□ |
| | | LENGTH 113d-6 (DISCHARGE TRAY 208-6) | □□□ |
| | | LENGTH 113d-7 (DISCHARGE TRAY 208-7) | □□□ |
| | | LENGTH 113d-8 (DISCHARGE TRAY 208-8) | □□□ |
| | | LENGTH 113d-9 (DISCHARGE TRAY 208-9) | □□□ |
| | | LENGTH 113d-10 (DISCHARGE TRAY 208-10) | □□□ |
| x040 ⋮ | ⋮ | | |

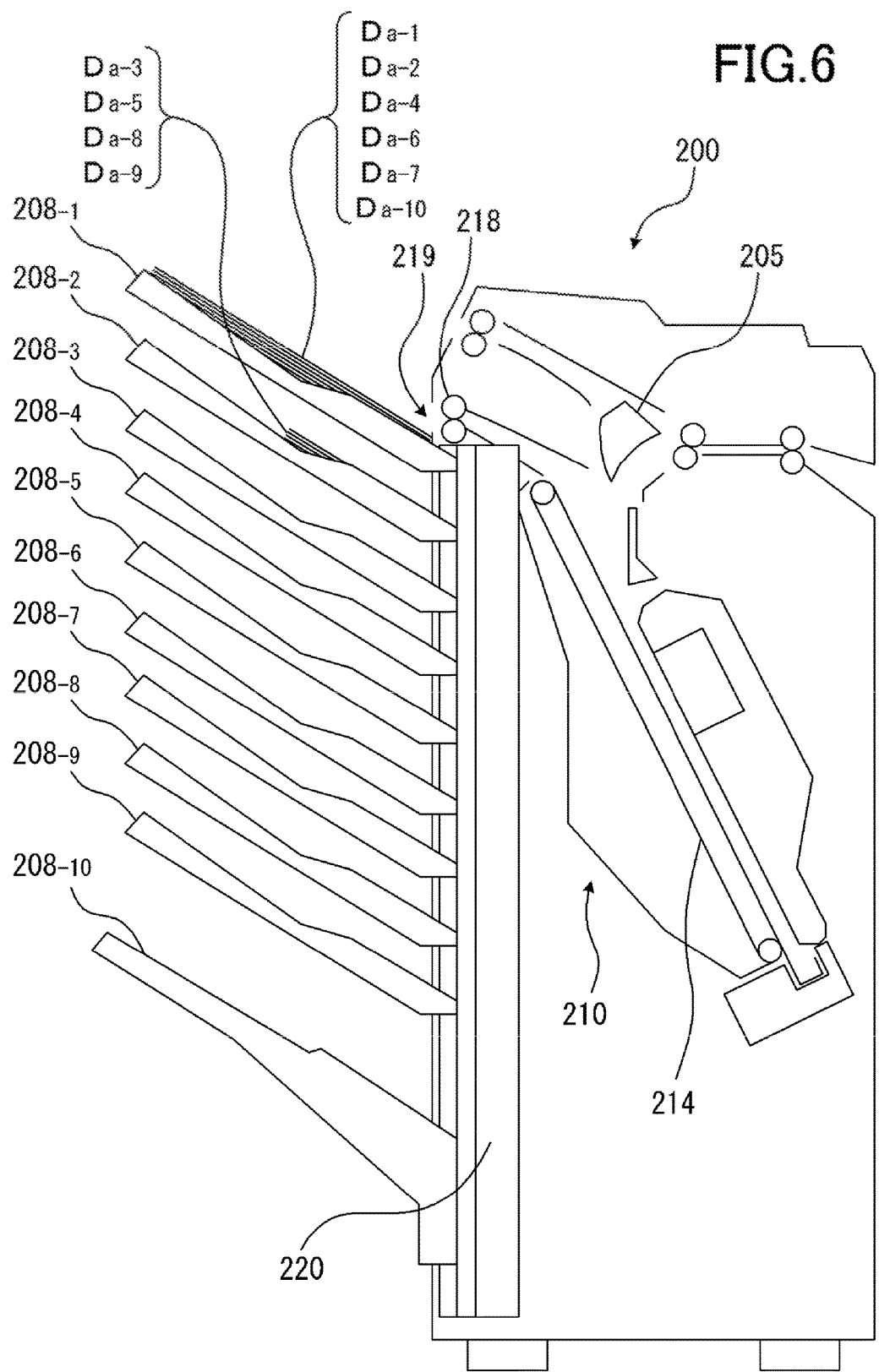

FIG.7B

| DOC. | SIZE AND DIREC. | W | L |
|---|---|---|---|
| Db-1 | A3 LONGITUDINAL | 297 | 420 |
| Db-2 | A3 LONGITUDINAL | 297 | 420 |
| Db-3 | A4 LATERAL | 297 | 210 |
| Db-4 | A3 LONGITUDINAL | 297 | 420 |
| Db-5 | A4 LATERAL | 297 | 210 |
| Db-6 | OTHER (B4 LONGITUDINAL) | 257 | 364 |
| Db-7 | A3 LONGITUDINAL | 297 | 420 |
| Db-8 | A4 LATERAL | 297 | 210 |
| Db-9 | A4 LATERAL | 297 | 210 |
| Db-10 | A3 LONGITUDINAL | 297 | 420 |

FIG.8

| TYPE (DESIGNATION OF STANDARD SIZE) | | LENGTH OF ONE SIDE (UNIT: mm) | |
|---|---|---|---|
| ISO A SERIES | A0 | 841 | 1189 |
| | A1 | 594 | 841 |
| | A2 | 420 | 594 |
| | A3 | 297 | 420 |
| | A4 | 210 | 297 |
| | A5 | 148 | 210 |
| | A6 | 105 | 148 |
| | A7 | 74 | 105 |
| JIS B SERIES | B0 | 1030 | 1456 |
| | B1 | 728 | 1030 |
| | B2 | 515 | 728 |
| | B3 | 364 | 515 |
| | B4 | 257 | 364 |
| | B5 | 182 | 257 |
| | B6 | 128 | 182 |
| | B7 | 91 | 128 |

FIG.11

| LOGICAL ADDRESS (AREA) | 113: MEMORY | | |
|---|---|---|---|
| | DATA (CONTENTS) | | |
| x000 ⋮ x009 | PROGRAM AREA (113a) | | |
| x010 ⋮ x019 | VARIOUS SETTING INFORMATION AREA (113b) | | |
| x020 ⋮ x029 | IMAGE DATA AREA (113c) | | |
| x030 ⋮ ⋮ x039 | SORTING DESTINATION INFORMATION AREA (113d) $\begin{pmatrix}\text{LENGTH 113d-1}\\\text{TO}\\\text{LENGTH 113d-10}\end{pmatrix}$ | LENGTH 113d-1 (DISCHARGE TRAY 208-1) | 420 |
| | | LENGTH 113d-2 (DISCHARGE TRAY 208-2) | 210 |
| | | LENGTH 113d-3 (DISCHARGE TRAY 208-3) | X |
| | | LENGTH 113d-4 (DISCHARGE TRAY 208-4) | □□□ |
| | | LENGTH 113d-5 (DISCHARGE TRAY 208-5) | □□□ |
| | | LENGTH 113d-6 (DISCHARGE TRAY 208-6) | □□□ |
| | | LENGTH 113d-7 (DISCHARGE TRAY 208-7) | □□□ |
| | | LENGTH 113d-8 (DISCHARGE TRAY 208-8) | □□□ |
| | | LENGTH 113d-9 (DISCHARGE TRAY 208-9) | □□□ |
| | | LENGTH 113d-10 (DISCHARGE TRAY 208-10) | □□□ |
| x040 ⋮ ⋮ ⋮ x049 | SIZE STORAGE AREA (113e) | ISO A0 | 841 | 1189 |
| | | ISO A1 | 594 | 841 |
| | | ISO A2 | 420 | 594 |
| | | ISO A3 | 297 | 420 |
| | | ISO A4 | 210 | 297 |
| | | ISO A5 | 148 | 210 |
| | | ⋮ | ⋮ | ⋮ |
| | | JIS B0 | 1030 | 1456 |
| | | JIS B1 | 728 | 1030 |
| | | JIS B2 | 515 | 728 |
| | | JIS B3 | 364 | 515 |
| | | JIS B4 | 257 | 364 |
| | | JIS B5 | 182 | 257 |
| | | ⋮ | ⋮ | ⋮ |
| x050 ⋮ | ⋮ | | |

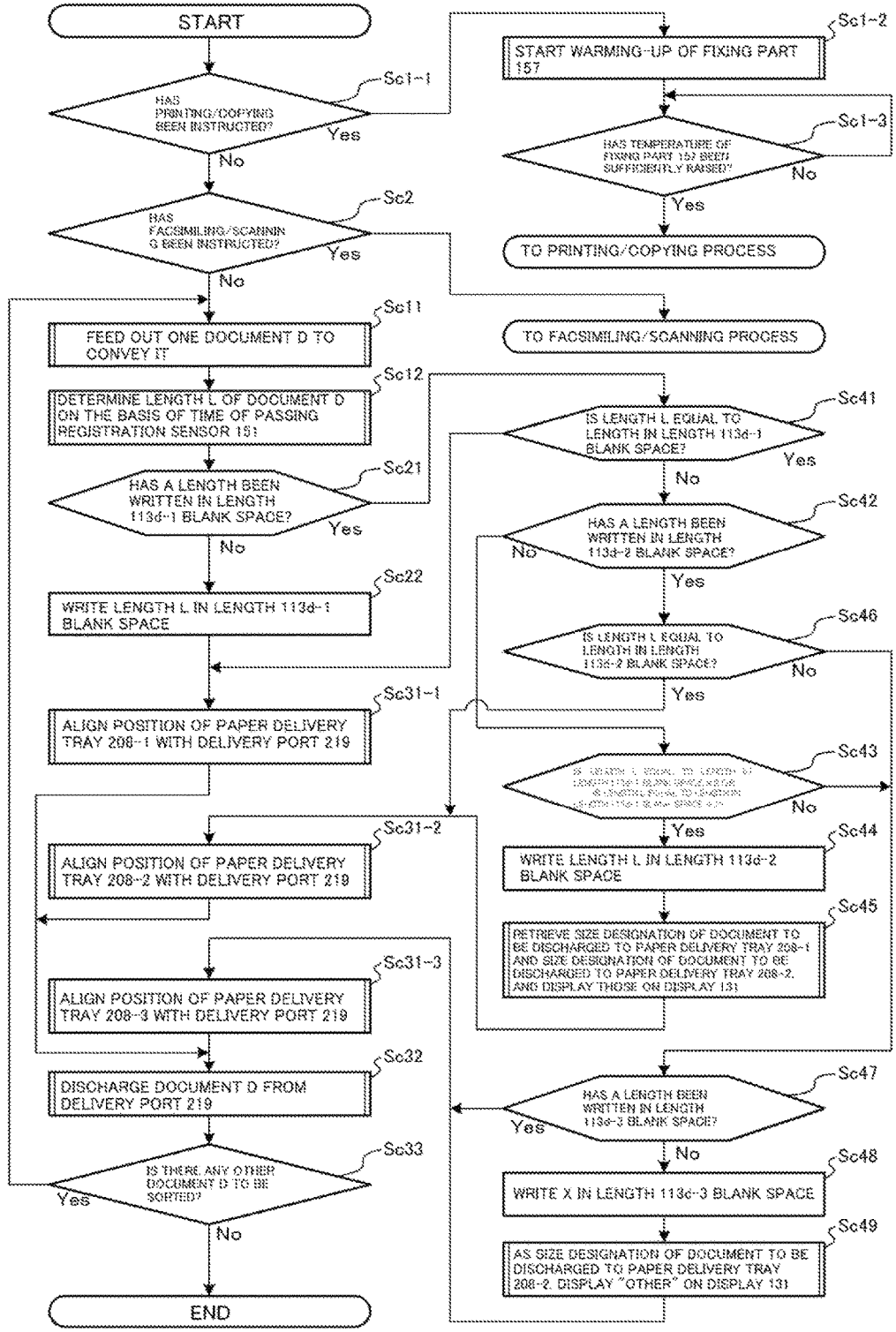

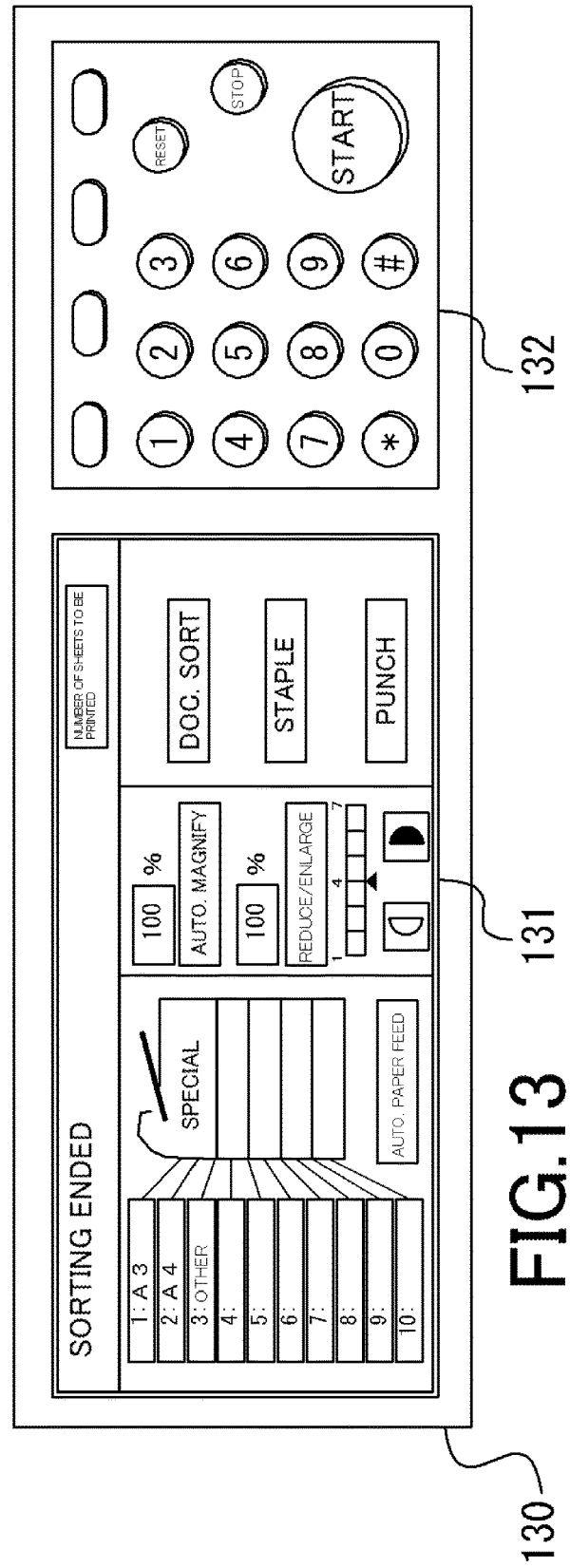

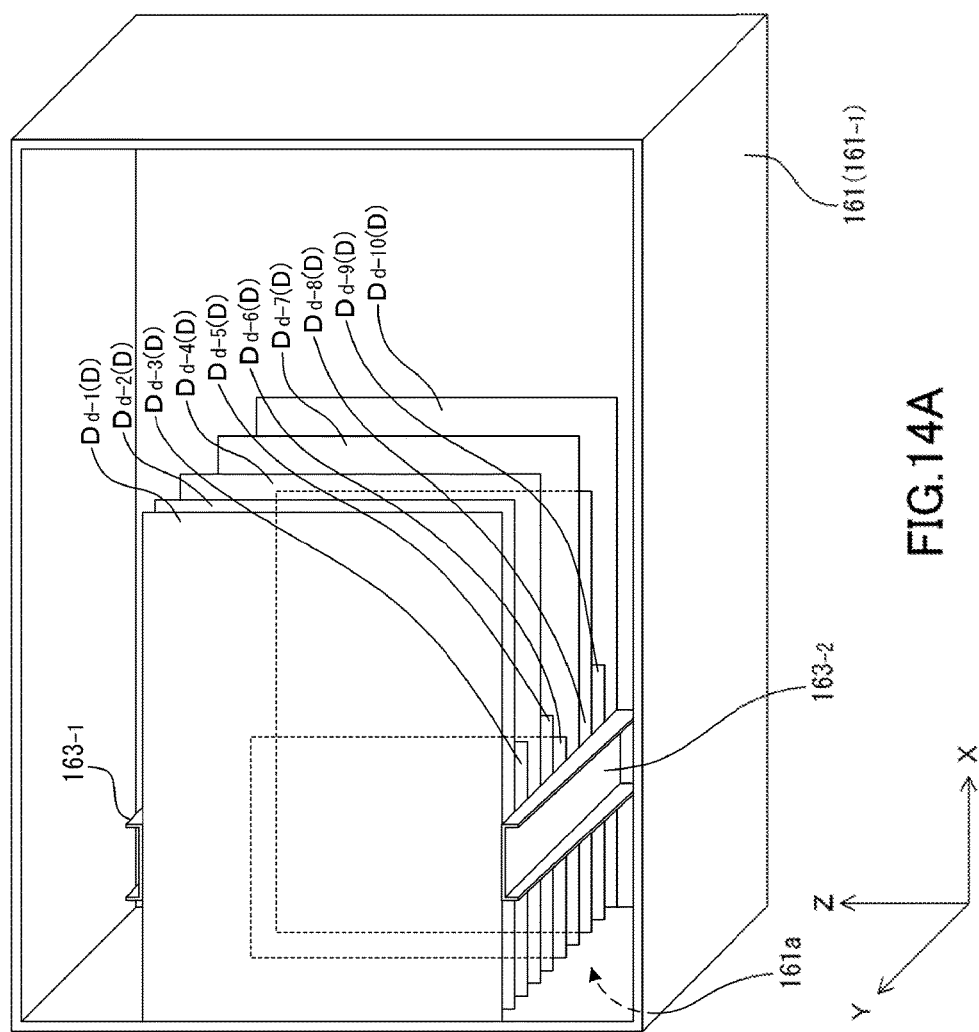

FIG.14B

| DOC. | SIZE AND DIREC. | W | L |
|---|---|---|---|
| Dd-1 | A3 LONGITUDINAL | 297 | 420 |
| Dd-2 | A3 LONGITUDINAL | 297 | 420 |
| Dd-3 | A4 LATERAL | 297 | 210 |
| Dd-4 | A3 LONGITUDINAL | 297 | 420 |
| Dd-5 | A4 LATERAL | 297 | 210 |
| Dd-6 | OTHER 1 (B5 LATERAL) | 257 | 182 |
| Dd-7 | A3 LONGITUDINAL | 297 | 420 |
| Dd-8 | OTHER 2 (B4 LONGITUDINAL) | 257 | 364 |
| Dd-9 | A4 LATERAL | 297 | 210 |
| Dd-10 | A3 LONGITUDINAL | 297 | 420 |

FIG.15

| LOGICAL ADDRESS (AREA) | DATA (CONTENTS) | | |
|---|---|---|---|
| 113: MEMORY | | | |
| x 0 0 0 ⋮ x 0 0 9 | PROGRAM AREA (113a) | | |
| x 0 1 0 ⋮ x 0 1 9 | VARIOUS SETTING INFORMATION AREA (113b) | | |
| x 0 2 0 ⋮ x 0 2 9 | IMAGE DATA AREA (113c) | | |
| x 0 3 0 ⋮ x 0 3 9 | SORTING DESTINATION INFORMATION AREA (113d) ( LENGTH 113d-1 TO LENGTH 113d-10 ) | LENGTH 113d-1 (DISCHARGE TRAY 208-1) | 100 or under |
| | | LENGTH 113d-2 (DISCHARGE TRAY 208-2) | 200 or under |
| | | LENGTH 113d-3 (DISCHARGE TRAY 208-3) | 300 or under |
| | | LENGTH 113d-4 (DISCHARGE TRAY 208-4) | 400 or under |
| | | LENGTH 113d-5 (DISCHARGE TRAY 208-5) | 500 or under |
| | | LENGTH 113d-6 (DISCHARGE TRAY 208-6) | Y |
| | | LENGTH 113d-7 (DISCHARGE TRAY 208-7) | □□□ |
| | | LENGTH 113d-8 (DISCHARGE TRAY 208-8) | □□□ |
| | | LENGTH 113d-9 (DISCHARGE TRAY 208-9) | □□□ |
| | | LENGTH 113d-10 (DISCHARGE TRAY 208-10) | □□□ |
| x 0 4 0 ⋮ | ⋮ | | |

FIG.17

| LOGICAL ADDRESS (AREA) | 113: MEMORY ||||
|---|---|---|---|---|
| | DATA (CONTENTS) ||||
| x 0 0 0 ⋮ x 0 0 9 | PROGRAM AREA (113a) ||||
| x 0 1 0 ⋮ x 0 1 9 | VARIOUS SETTING INFORMATION AREA (113b) ||||
| x 0 2 0 ⋮ x 0 2 9 | IMAGE DATA AREA (113c) ||||
| x 0 3 0 ⋮ x 0 3 9 | SORTING DESTINATION INFORMATION AREA (113d) (LENGTH 113d-1 TO LENGTH 113d-10) | LENGTH 113d-1 (DISCHARGE TRAY 208-1) | 200 or under ||
| ^ | ^ | LENGTH 113d-2 (DISCHARGE TRAY 208-2) | 300 or under ||
| ^ | ^ | LENGTH 113d-3 (DISCHARGE TRAY 208-3) | 400 or under ||
| ^ | ^ | LENGTH 113d-4 (DISCHARGE TRAY 208-4) | Y ||
| ^ | ^ | LENGTH 113d-5 (DISCHARGE TRAY 208-5) | □□□ ||
| ^ | ^ | LENGTH 113d-6 (DISCHARGE TRAY 208-6) | □□□ ||
| ^ | ^ | LENGTH 113d-7 (DISCHARGE TRAY 208-7) | □□□ ||
| ^ | ^ | LENGTH 113d-8 (DISCHARGE TRAY 208-8) | □□□ ||
| ^ | ^ | LENGTH 113d-9 (DISCHARGE TRAY 208-9) | □□□ ||
| ^ | ^ | LENGTH 113d-10 (DISCHARGE TRAY 208-10) | □□□ ||
| x 0 4 0 ⋮ | ⋮ ||||

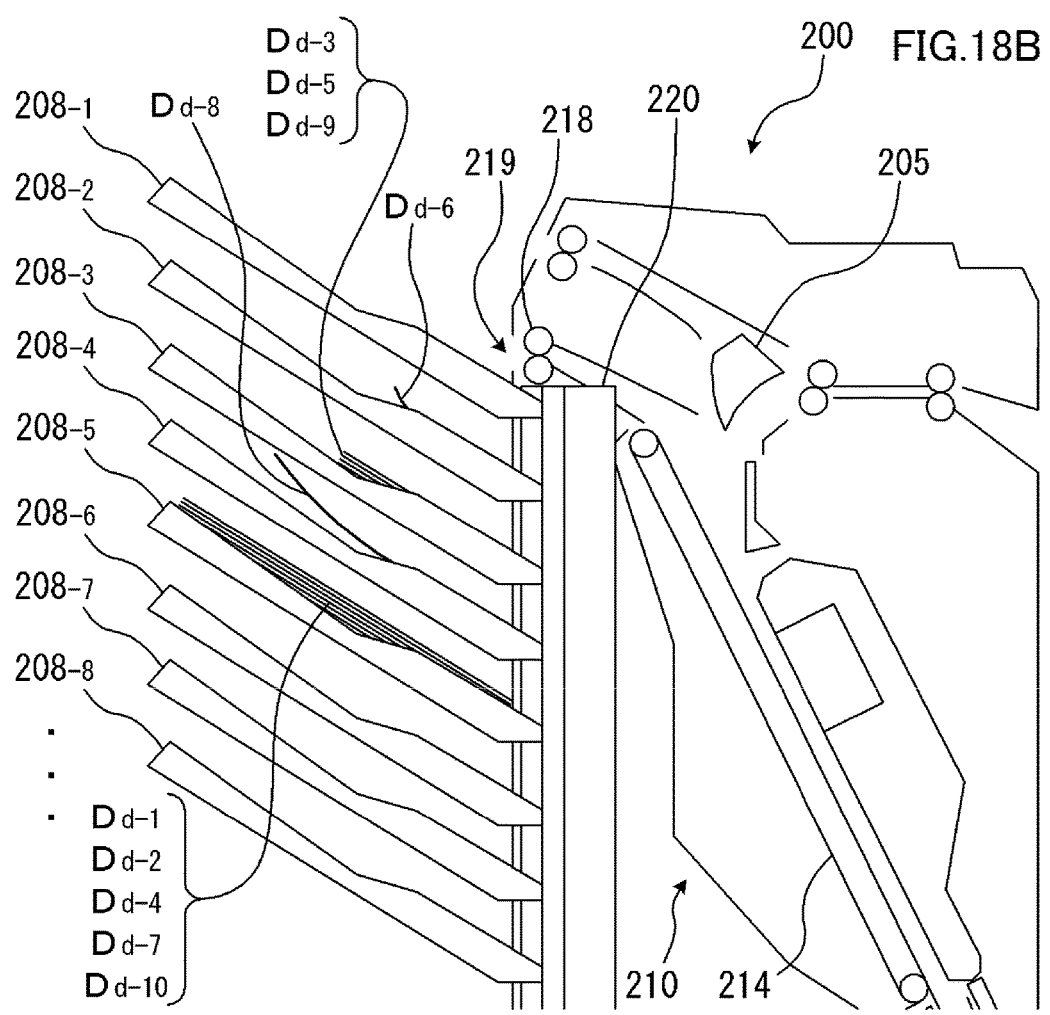

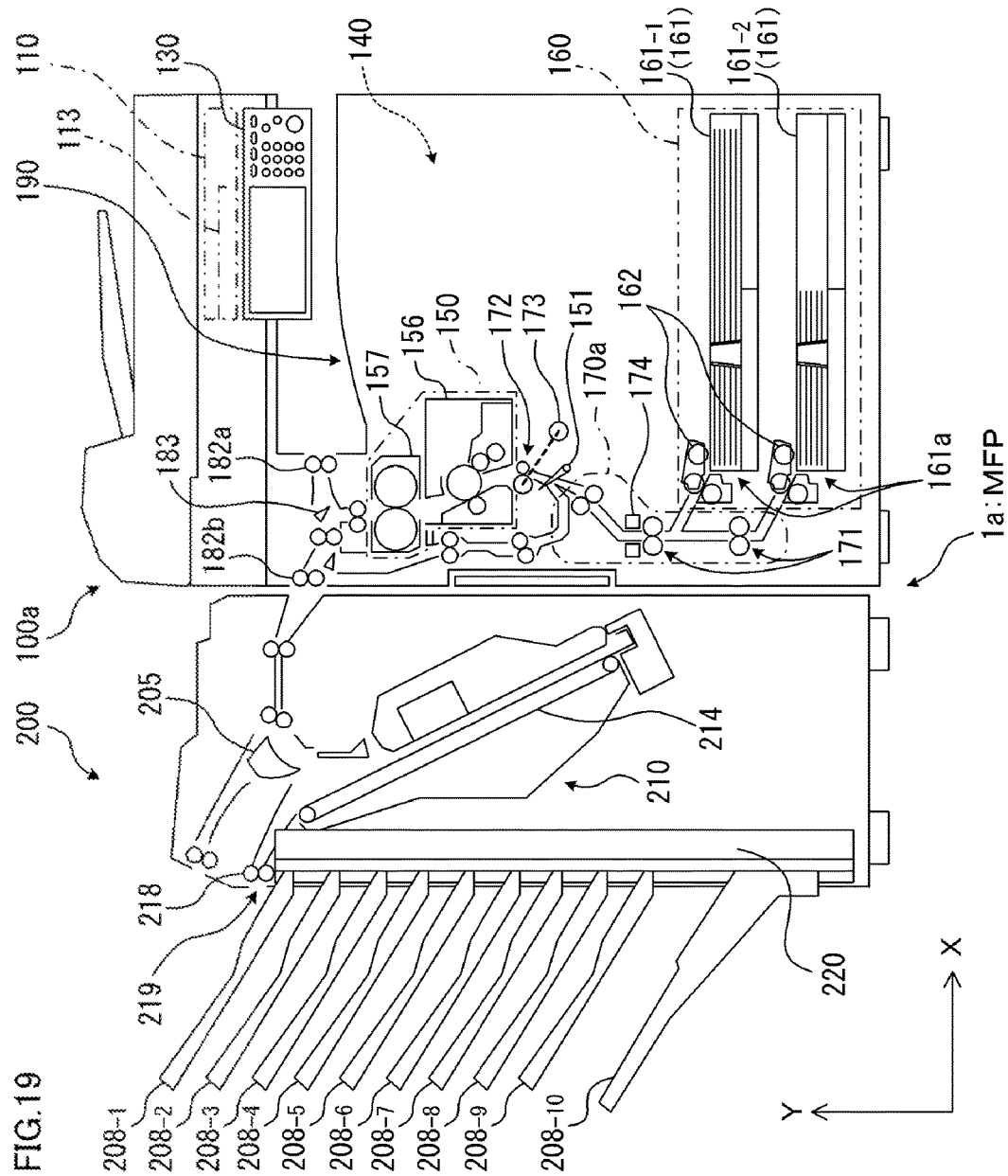

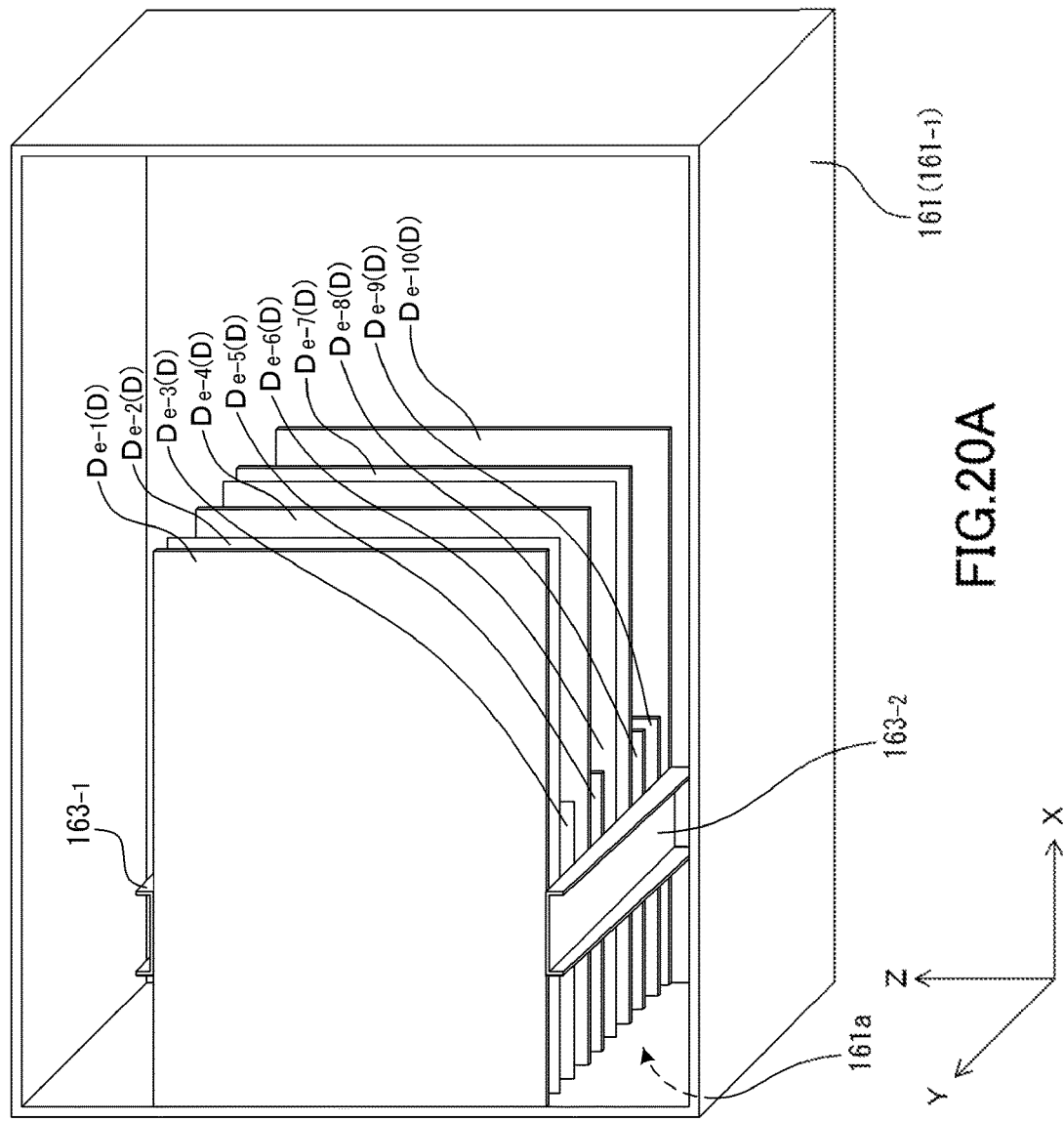

FIG.20B

| DOC. | SIZE AND DIREC. | SHEET THICKNESS | W | L |
|---|---|---|---|---|
| De-1 | A3 LONGITUDINAL | THICK (TH) | 297 | 420 |
| De-2 | A3 LONGITUDINAL | THIN (TL) | 297 | 420 |
| De-3 | A4 LATERAL | THIN (TL) | 297 | 210 |
| De-4 | A3 LONGITUDINAL | THICK (TH) | 297 | 420 |
| De-5 | A4 LATERAL | THICK (TH) | 297 | 210 |
| De-6 | A3 LONGITUDINAL | THIN (TL) | 297 | 420 |
| De-7 | A3 LONGITUDINAL | THICK (TH) | 297 | 420 |
| De-8 | A4 LATERAL | THICK (TH) | 297 | 210 |
| De-9 | A4 LATERAL | THICK (TH) | 297 | 210 |
| De-10 | A3 LONGITUDINAL | THICK (TH) | 297 | 420 |

FIG.21A

SORTING ON A THICKNESS-PRIORITY BASIS

113: MEMORY

| LOGICAL ADDRESS (AREA) | DATA (CONTENTS) | | | |
|---|---|---|---|---|
| x000···x010 | PROGRAM AREA (113a) | | | |
| x010···x019 | VARIOUS SETTING INFORMATION AREA (113b) | | | |
| x020···x029 | IMAGE DATA AREA (113c) | | | |
| x030 ··· x039 | SORTING DESTINATION INFORMATION AREA (113f) (TYPE 113f-1 TO TYPE 113f-10) | TYPE 113f-n (DISCHARGE TRAY 208-n) | SORTING CONDITIONS | |
| | | | THICKNESS | LENGTH |
| | | 113f-1(208-1) | TL | 300 OR UNDER |
| | | 113f-2(208-2) | TL | N |
| | | 113f-3(208-3) | TH | 300 OR UNDER |
| | | 113f-4(208-4) | TH | N |
| | | 113f-5(208-5) | □ | □ |
| | | 113f-6(208-6) | □ | □ |
| | | 113f-7(208-7) | □ | □ |
| | | 113f-8(208-8) | □ | □ |
| | | 113f-9(208-9) | □ | □ |
| | | 113f-10(208-10) | □ | □ |
| x040 ··· | | | | |

FIG.21B

SORTING ON A LENGTH-PRIORITY BASIS

| LOGICAL ADDRESS (AREA) | DATA (CONTENTS) 113: MEMORY | | | |
|---|---|---|---|---|
| x000···x010 | PROGRAM AREA (113a) | | | |
| x010···x019 | VARIOUS SETTING INFORMATION AREA (113b) | | | |
| x020···x029 | IMAGE DATA AREA (113c) | | | |
| x030 ... x039 | SORTING DESTINATION INFORMATION AREA (113f) (TYPE 113f-1 TO TYPE 113f-10) | TYPE 113f-n (DISCHARGE TRAY 208-n) | SORTING CONDITIONS | |
| | | | THICKNESS | LENGTH |
| | | 113f-1(208-1) | TL | 300 OR UNDER |
| | | 113f-2(208-2) | TH | 300 OR UNDER |
| | | 113f-3(208-3) | TL | N |
| | | 113f-4(208-4) | TH | N |
| | | 113f-5(208-5) | □□□ | □□ |
| | | 113f-6(208-6) | □□□ | □□ |
| | | 113f-7(208-7) | □□□ | □□ |
| | | 113f-8(208-8) | □□□ | □□ |
| | | 113f-9(208-9) | □□□ | □□ |
| | | 113f-10(208-10) | □□□ | □□ |
| x040 ... | | | | |

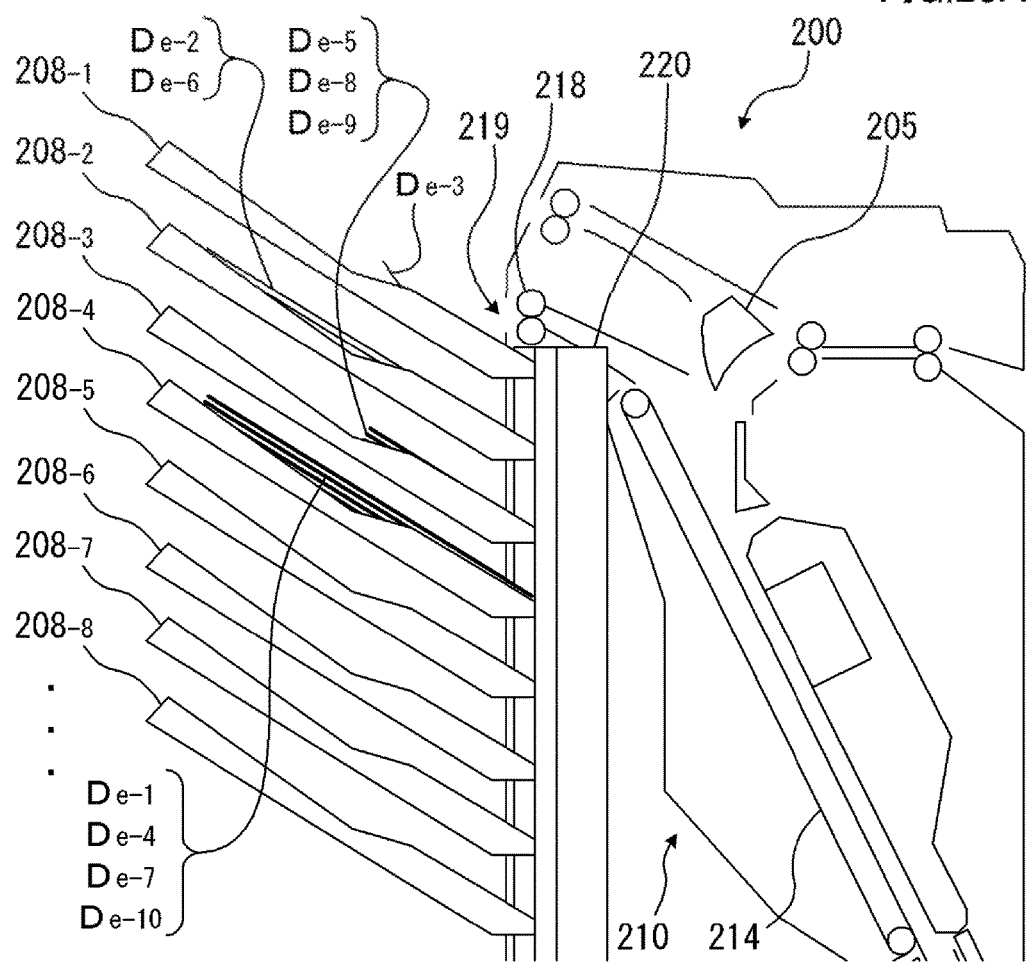

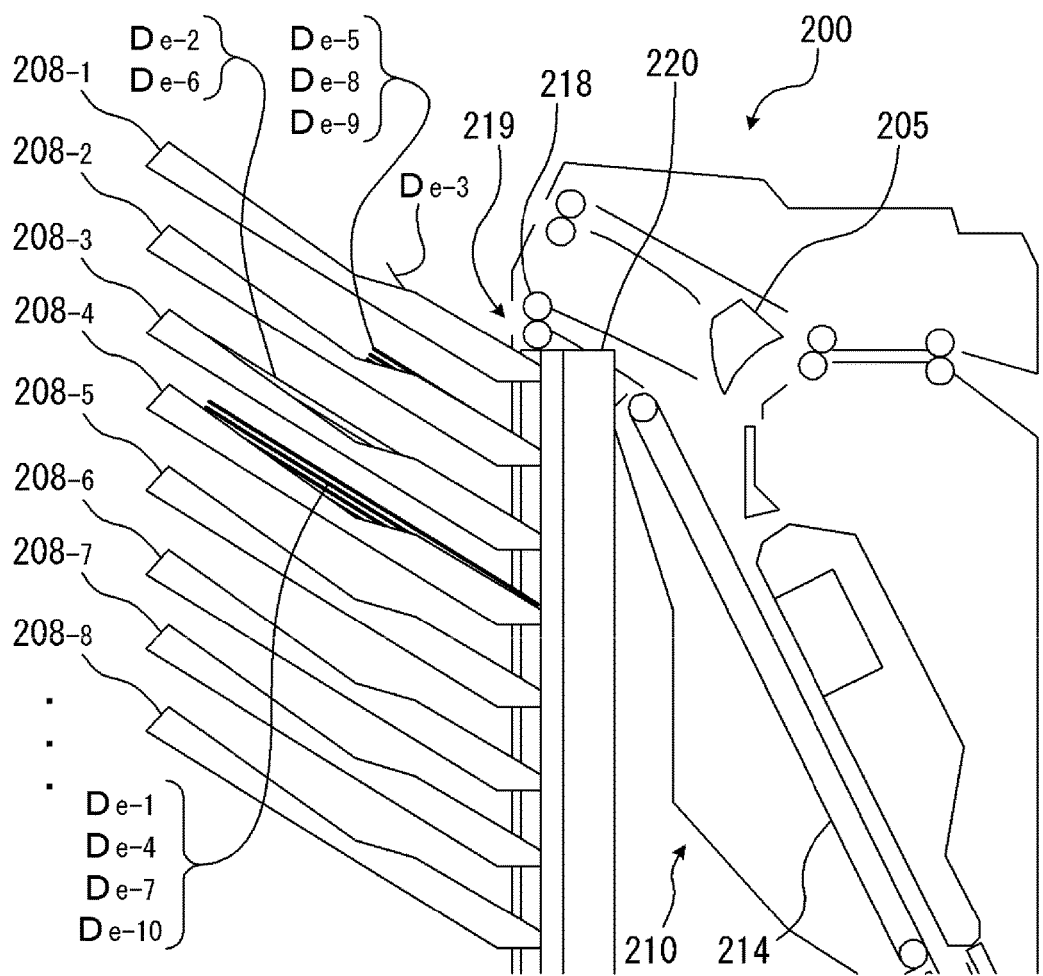

IMAGE FORMING APPARATUS AND SORTING METHOD

INCORPORATION BY REFERENCE

This application is based on and claims the benefit of priority from Japanese Patent Application No. 2015-038213 filed on Feb. 27, 2015, the entire contents of which are hereby incorporated by reference.

BACKGROUND

The present disclosure relates to an image forming apparatus that outputs a printed matter, and particularly relates to an image forming apparatus provided with a sorting function, and a sorting method.

As an attachment for use with copying machines or Multifunctional Peripherals (MFPs) (apparatuses having a combination of functions, such as those of printer, scanner, and facsimile), there is available a device called a mail box.

This mail box is used for sorting printed documents (printed paper sheets) by works or under any other specified condition. In other words, the mail box is intended to separate and discharge copying documents or facsimiling documents that have been processed with an image fed from a computer interrupting the printing, and to discharge each of a plurality of bundles of a plurality of printed documents to a separate discharge destination to thereby facilitate recovery and bookbinding of the printed documents.

As a technique that applies the mail box function, for example, there is available a technique for an image forming apparatus that sorts the discharge destinations by the margin part of the printed documents to be discharged.

In other words, the technique is intended to facilitate reuse of the printed paper sheets by detecting the margin part of the paper sheet.

In addition, there is also a technique that detects the size of a printed paper sheet at the time of printing, and sorts the discharge destinations by size.

SUMMARY

According to one aspect of the present disclosure, an image forming apparatus of the present disclosure includes a paper feeding part, a registration roller pair, a first detecting part, a paper discharging part, a plurality of paper delivery trays, a storing part, a moving part, a control part, and an inputting part. The paper feeding part accommodates a plurality of documents. The registration roller pair conveys a document fed out from the paper feeding part to the image forming part at a specified speed. The first detecting part detects the pass of an edge part of the document immediately before being conveyed to the image forming part. The paper discharging part discharges the document that has been conveyed after having passed the image forming part. The plurality of paper delivery trays accumulate the document that has been discharged to the paper discharging part. The storing part stores a piece of characteristic information related to the document that is accumulated on each of the plurality of paper delivery trays. The moving part moves any one of the plurality of paper delivery trays or all of the plurality of paper delivery trays to a specified position. The control part controls the moving part. The inputting part inputs various numerical values or various instruction commands to the control part. The control part determines a length of the document in a direction of conveyance from the time required from the moment when the document conveyed at the specified speed has reached the first detecting part to the moment when the document passes the first detecting part; determines any one of the plurality of paper delivery trays as a sorting destination on the basis of the length of each of the plurality of documents along the direction of conveyance, and the piece of characteristic information that has been previously stored in the storing part or otherwise is stored in a successive manner; and moves the paper delivery tray as the sorting destination to a position opposed to the paper discharging part.

In addition, according to another aspect of the present disclosure, a sorting method of the present disclosure is used with an image forming apparatus having a paper feeding part that accommodates a plurality of documents; a registration roller pair that conveys a document fed out from the paper feeding part to an image forming part at a specified speed; a first detecting part for detecting the pass of an edge part of the document immediately before being conveyed to the image forming part; a paper discharging part that discharges the document that been conveyed after having passed the image forming part; a plurality of paper delivery trays that accumulate the document that has been discharged to the paper discharging part; a storing part for storing a piece of characteristic information related to the document that is accumulated on each of the plurality of paper delivery trays; a moving part for moving any one of the plurality of paper delivery trays or all of the plurality of paper delivery trays to a specified position; a control part that controls the moving part; and an inputting part for inputting various numerical values or various instruction commands to the control part, and includes a first step of determining a length of the document in a direction of conveyance from the time required from the moment when the document conveyed at the specified speed has reached the first detecting part to the moment when the document passes the first detecting part. A second step determines any one of the plurality of paper delivery trays as a sorting destination on the basis of the length of each of the plurality of documents along the direction of conveyance, and the piece of characteristic information that has been previously stored in the storing part or otherwise is stored in a successive manner, and specifies the sorting destination of the document on the basis of the length of each of the plurality of documents along the direction of conveyance, and the piece of characteristic information that has been previously stored in the storing part or otherwise is stored in a successive manner. A third step moves the paper delivery tray as the sorting destination of the document that has been specified in the second step to a position opposed to the paper discharging part. A fourth step discharges the document from the paper discharging part.

BRIEF DESCRIPTION OF THE DRAWINGS

FIG. 3B is a figure explaining one example of the state of documents accommodated in the paper sheet cassette in the first embodiment of the present disclosure;

FIG. 4 is a figure (memory map) explaining the contents of a memory in the first embodiment of the present disclosure;

FIG. 6 is a figure explaining one example of the state of a post-processing mechanism and documents after a sorting process in the first embodiment of the present disclosure having been performed;

FIG. 7B is a figure explaining one example of the state of documents accommodated in the paper sheet cassette in the first embodiment of the present disclosure;

FIG. 8 is a figure giving the dimensions of the paper sheets of the standard sizes that are assumed to be supplied to an image forming apparatus of the present disclosure;

FIG. 11 is a figure (memory map) explaining the contents of a memory in a third embodiment of the present disclosure;

FIG. 12 is a flowchart illustrating the flow of processing in the third embodiment of the present disclosure;

FIG. 13 is a figure showing an example of display of the display in the third embodiment of the present disclosure;

FIG. 14A is a figure explaining a paper sheet cassette in a fourth embodiment of the present disclosure and one example of the state of documents accommodated therein;

FIG. 14B is a figure explaining one example of the state of documents accommodated in the paper sheet cassette in the fourth embodiment of the present disclosure;

FIG. 15 is a figure (memory map) explaining the contents of a memory in the fourth embodiment of the present disclosure;

FIG. 17 is a figure (memory map) explaining the contents of a memory after a rearrangement having been performed in the fourth embodiment of the present disclosure;

FIG. 18B is a figure explaining one example of the state of a post-processing mechanism and documents after a sorting process in the fourth embodiment of the present disclosure having been performed;

FIG. 19 is a figure illustrating an internal configuration of the entire MFP according to a fifth embodiment of the present disclosure;

FIG. 20A is a figure explaining a paper sheet cassette in a fifth embodiment of the present disclosure and one example of the state of documents accommodated therein;

FIG. 20B is a figure explaining one example of the state of documents accommodated in the paper sheet cassette in the fifth embodiment of the present disclosure;

FIG. 21A is a figure (memory map) explaining the contents of a memory in the fifth embodiment of the present disclosure;

FIG. 21B is a figure (memory map) explaining the contents of a memory in the fifth embodiment of the present disclosure;

FIG. 23A is a figure explaining one example of the state of a post-processing mechanism and documents after a sorting process in the fifth embodiment of the present disclosure having been performed; and FIG. 23B is a figure explaining one example of the state of a post-processing mechanism and documents after a sorting process in the fifth embodiment of the present disclosure having been performed.

DETAILED DESCRIPTION

Next, an embodiment of the present disclosure will be specifically explained with reference to the drawings. In the present embodiment, as one example of image forming apparatus, an MFP (Multi Function Peripheral) is used, however, the configuration of a general MFP and the motion thereof will be first explained. In addition, about the portions that are not characteristic in the present disclosure, or that are low in relevancy with the characteristic parts thereof, application of a symbol thereto and explanation of them will be omitted.

Figure 1:
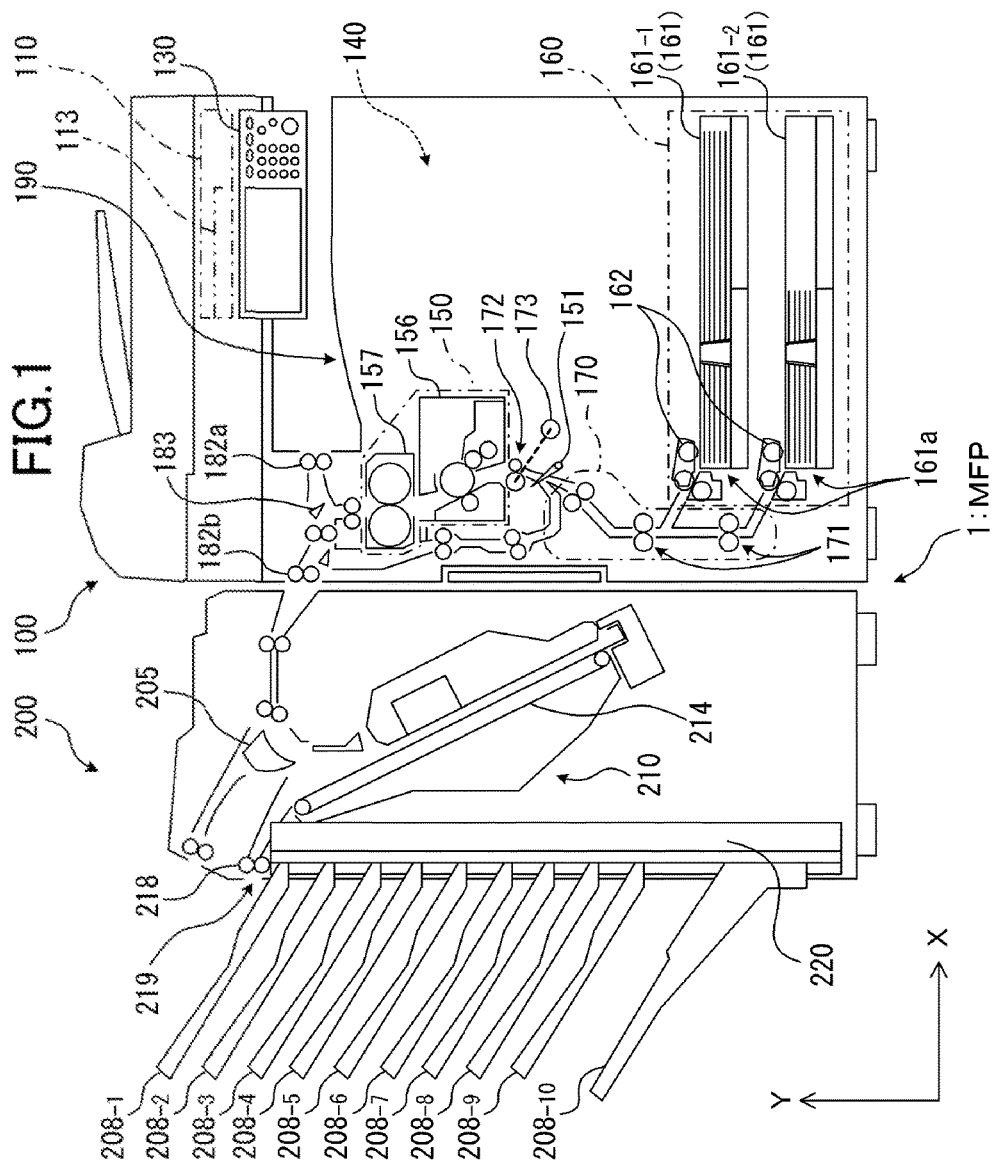
FIG. 1 is a figure illustrating an internal configuration of the entire MFP according to each embodiment of the present disclosure.

With reference to FIG. 1, the MFP 1 includes a main body apparatus 100 that provides image printing on a printing paper sheet, and a post-processing mechanism 200 that takes in printed documents that have been printed by the main body apparatus 100, and performs sorting processing, or the like, thereof.

Figure 2:
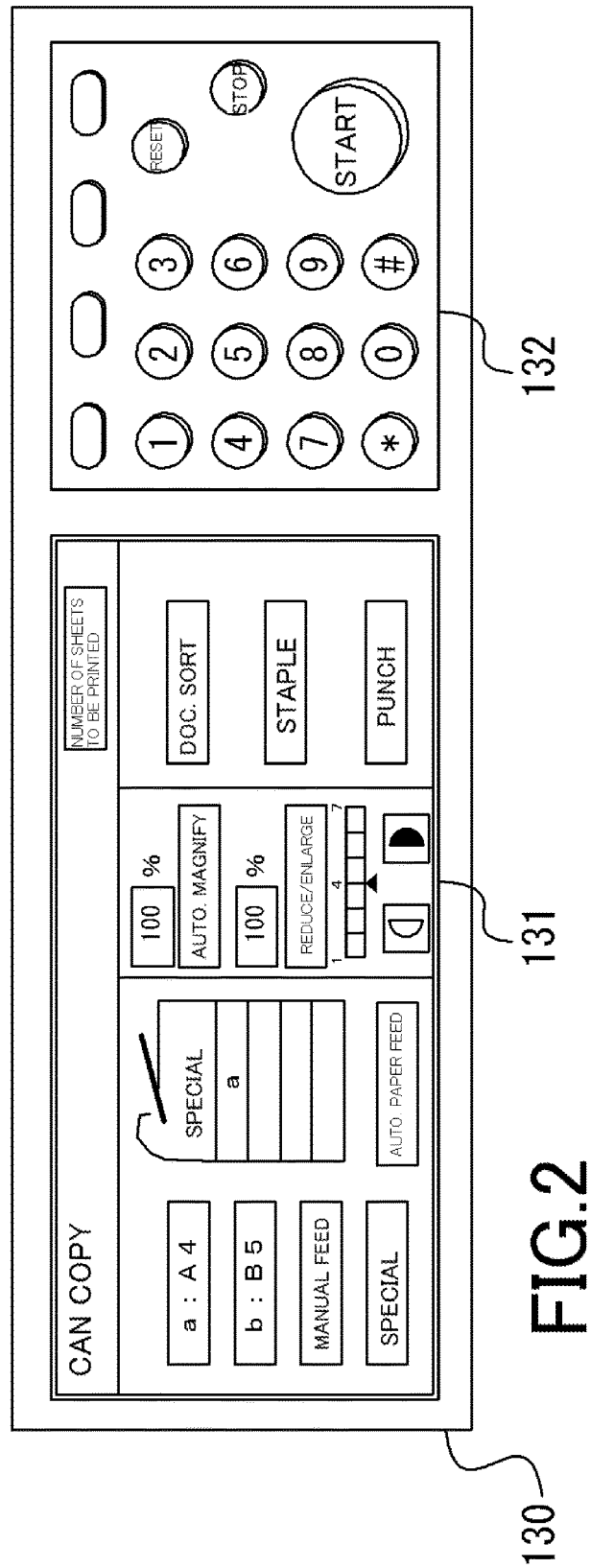
FIG. 2 is a figure illustrating one example of an operation part provided for an MFP in each embodiment of the present disclosure.

On the front face of the main body apparatus 100, there is disposed an operation part 130 for making setting of the main body apparatus 100 or the post-processing mechanism 200 and giving operation instructions thereto. With reference to FIG. 2, in the operation part 130, there are disposed a display 131 that is provided with a transparent touch panel on the surface of a liquid crystal display panel, and a keyboard 132 for inputting a numerical value of the number of sheets to be printed, or the like.

Inside of the top of the main body apparatus 100, there is provided a main body control part 110. In addition, in the main body control part 110, there is provided a memory 113 (which may be a hard disk device, or the like, but it is interpreted as a memory).

In the memory 113, a program for controlling the operation of the main body control part 110 is written in. Besides it, various data related to environmental setting for each component of the MFP 1 or image data, and the numerical values, and the like, that provide the reference for sorting in the present embodiment are written in.

In addition, in the lower part of the main body apparatus 100, a recording part 140 is provided. The recording part 140 includes an image forming part 150 having an optics part 156 and a fixing part 157; a paper feeding part 160; a carrying passage 170 having conveyance roller pairs 171, 171, . . . ; a registration sensor 151; a registration roller pair 172; paper discharging rollers 182a and paper discharging rollers 182b; and a paper delivery tray 190.

The registration sensor 151 is composed, as one example, of a combination of a later described lever that is pressed with a printing paper sheet being passed, and an electric switch that is turned on or off by the motion of this lever. The registration sensor 151 senses the reach of the front edge part of a printing paper sheet and the subsequent pass of the rear edge part thereof.

In addition, the registration roller pair 172 shall be configured such that it is turned by an exact definite number of revolutions (or it allows the number of revolutions made to be exactly grasped in a successive manner). For example, if the registration roller pair 172 is that which is rotation-driven by a stepping motor 173, by measuring the number of pulses supplied to the stepping motor 173, the amount of revolution that has been made by the registration roller pair 172 can be grasped.

The paper feeding part 160 includes a plurality of paper feeding cassettes 161-1 and 161-2 (hereinafter, to be referred to simply as a paper feeding cassette 161 as required) that accommodate printing paper sheets, or the like. Each of the paper feeding cassettes 161-1 and 161-2 is provided with a feeding roller 162 in such a location as that above one end thereof (a feeding end 161*a*) for feeding out printing paper sheets one by one to a carrying passage 170.

Each of the paper feeding cassettes 161-1 and 161-2 has a lifting mechanism that lifts the accommodated printing paper sheets, or the like, keeping them level. However, the lifting mechanism itself is not a characteristic portion of the present disclosure, and therefore the detailed explanation will be omitted.

The operation of the general MFP 1 will be explained. Upon the main body control part 110 having received an instruction for copying or printing, it resumes supply of electric power to a fixing part 157, starting warming up of the fixing part 157. With this fixing part 157, electric power is cut off for saving when it is not operated.

Thereafter, once the optics part 156 has been cleaned and prepared for forming an image on the printing paper sheet and the fixing part 157 has been warmed up, a printing paper sheet is fed out from the paper feeding cassette 161-1 or 161-2 by the feeding roller 162.

The printing paper sheet that has been fed out to the carrying passage 170 is conveyed to the image forming part 150 by the conveyance rollers 171, 171, . . . .

The registration sensor 151 senses that the front edge of the printing paper sheet has reached the location of the registration roller pair 172, which is in front of the image forming part 150.

Then, at the point of time when the registration sensor 151 has sensed the front edge of the printing paper sheet, for example, conveyance of the printing paper sheet is once stopped. Then, in accordance with the timing at the completion of preparation for the subsequent processing by the optics part 156, conveyance of the printing paper sheet by the registration roller pair 172 is resumed, thereby the printing position of the printing paper sheet being registered.

The optics part 156 includes a laser device and a mirror, or the like, as well as a photosensitive drum, an electrifying part, an exposure part, a developing part, and a transfer part. The optics part 156 forms a toner image on the printing paper sheet on the basis of the image data.

The printing paper sheet on which the toner image has been formed by the optics part 156 is fed to the fixing part 157. The fixing part 157 heats and presses the printing paper sheet to which the toner image has been transferred, thereby fixing the toner image on the printing paper sheet (hereinafter, the printing paper sheet will be referred to as a printed document).

Thereafter, the printed document is outputted to the outside of the main body apparatus 100 by the paper discharging roller 182*a* or otherwise the paper discharging roller 182*b*.

Selection of whether to convey the printed document to the side of the paper discharging rollers 182*a*, or to convey it to the side of the paper discharging rollers 182*b* is performed by a turnable switching claw 183 in accordance with the operation of the operation part 130, or the like.

Thus, when the printed document is guided to the paper discharging rollers 182*a*, for example, by the switching claw 183, it is outputted to the paper delivery tray 190.

On the other hand, when the printed document is guided to the paper discharging rollers 182*b* by the switching claw 183, it is conveyed to the post-processing mechanism 200.

With reference to FIG. 2, the post-processing mechanism 200 is comprised of a stock part 210 having an endless belt 214; a guide claw 205 that can be turned in accordance with the conveyance destination of the printed document; a paper discharging roller pair 218 for discharging the printed document from the delivery port 219; a plurality of paper delivery trays 208-1, 208-2, . . . (in the present embodiment, 10 stages up to 208-10) that are vertically arranged; and an elevating mechanism 220 that causes these paper delivery trays 208-1, 208-2, . . . , and 208-10 (hereinafter, to be referred to simply as the paper delivery trays 208, . . . , as required) to be moved upward or downward.

In the present embodiment, the guide claw 205 is stopped in an orientation for feeding the printed document into the stock part 210. In other words, the printed document that has been brought into the post-processing mechanism 200 from the main body apparatus 100 is conveyed into the stock part 210, being temporarily stocked (the printed documents are stacked here as required).

The printed document that has been temporarily stocked in the stock part 210 is pushed upward by the endless belt 214, being then pushed out by the paper discharging roller pair 218 from the delivery port 219.

At this time, the elevating mechanism 220 is moved upward or downward such that any one of the paper delivery trays 208-1 to 208-10 onto which the printed document is to be discharged is aligned with the location of the delivery port 219. In other words, when the printed document is to be discharged onto the paper delivery tray 208-1, the paper delivery trays 208, . . . are lowered to a specified downward position. On the other hand, when the printed document is to be discharged onto the paper delivery tray 208-10, the paper delivery trays 208, . . . are raised to a specified upward position.

First Embodiment

In order to facilitate the understanding of the present disclosure, as a first embodiment, the case where documents having two different sizes are mixed are to be sorted by size will be explained.

Figure 3A:
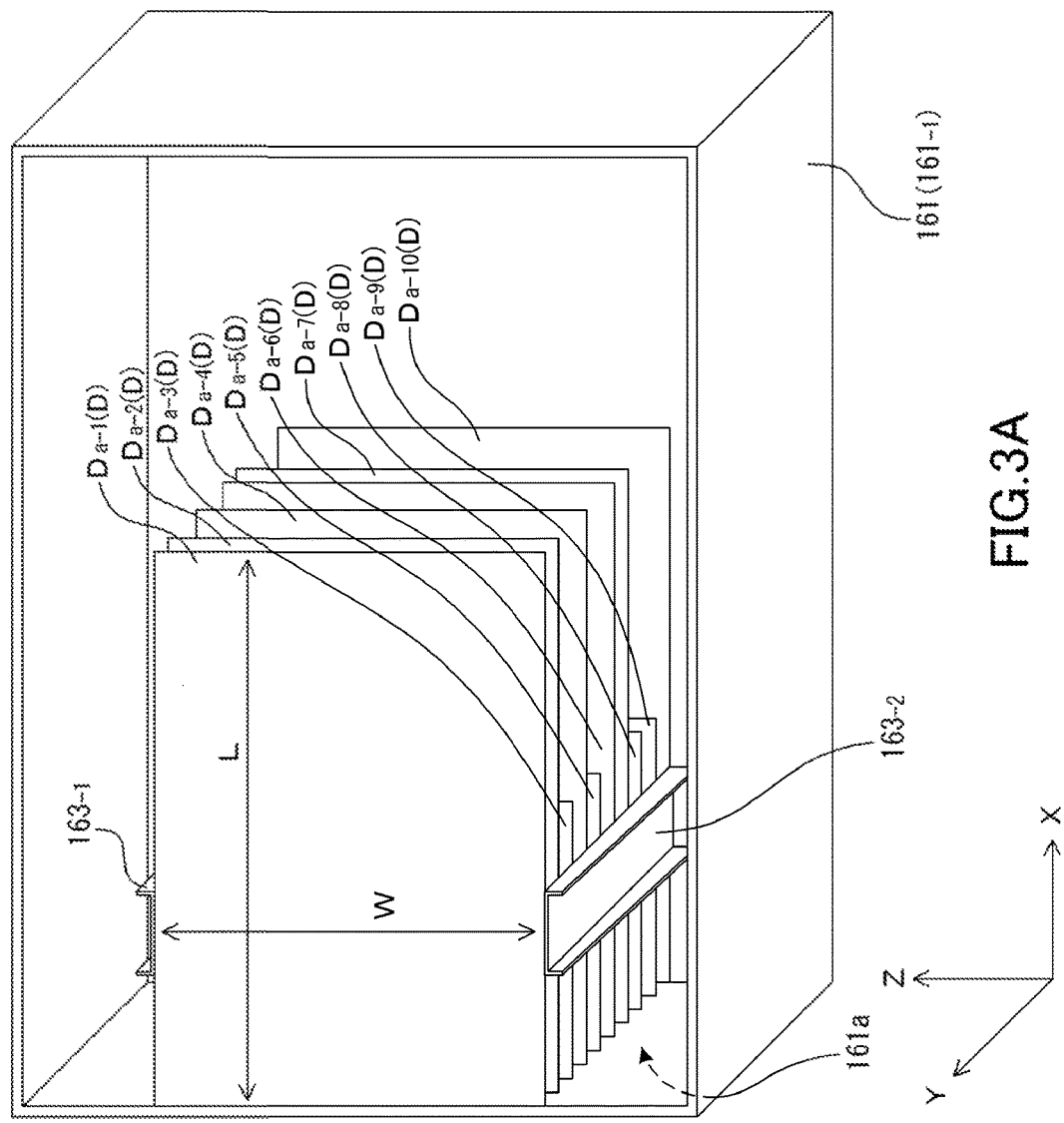
FIG. 3A is a figure explaining a paper sheet cassette in a first embodiment of the present disclosure and one example of the state of documents accommodated therein.

With the paper feeding cassette 161 shown in FIG. 3A, paper sheet guides 163-1 and 163-2, which are provided in the bottom part thereof, determine the paper sheet placement area width W. Between these paper sheet guide 163-1 and paper sheet guide 163-2, ten documents Da-1 to Da-10 having a width W (hereinafter, to be referred to simply as documents D, as required) are placed with one edge part of each of them being aligned with the location of the feeding end 161*a*.

The present disclosure presupposes that, in the case where, as shown in FIG. 3A, the width of each of a plurality of documents D, D . . . that are to be fed out from the paper feeding cassette 161 is the same (substantially the same), these documents D, D . . . are sorted by their various characteristics.

FIG. 3B gives an example of detailed breakdown of the size and direction of the documents Da-1 to Da-10 in the first embodiment.

The "A3 longitudinal" given in FIG. 3B means that the length (L) is 420 mm and the width (W) is 297 mm. On the other hand, the "A4 lateral" means that the length (L) is 210 mm and the width (W) is 297 mm.

In this way, it is understood that the documents Da-1 to Da-10 shown in FIG. 3A and FIG. 3B have the same width, while having two different lengths along the direction of conveyance of 420 mm and 210 mm (assuming that, in the first embodiment, the dimension tolerance for the documents D . . . can be neglected).

Here, the contents that are to be recorded in the memory 113 in the present embodiment will be explained. FIG. 4 gives a relationship between the address and the data for the memory 113. In FIG. 4, the relationship between a particular area and the location is indicated with a logical address, and therefore, the size (for example, the number of bytes) of data for one unit of address varies depending upon the contents. In addition, in case where the physical addresses (not given in FIG. 4) are investigated, a set of data (for example, image data for one page) may be distributed in a plurality of physical address areas that are not continued.

In the memory 113, there are provided, for example, a program area 113*a* (the logical addresses thereof being x000 to x009) for recording a program for the MFP 1 to control the operation; a various setting information area 113*b* (the logical addresses thereof being x010 to x019) for recording the environmental information for use of the image forming apparatus of the present disclosure as an MFP (the installation region, the FAX number, the sizes of recording papers to be accommodated, the setting of the back light in the operation part 130, and the like); and an image data area 113*c* (the logical addresses thereof being x020 to x029) for rearranging or temporary storage of the image data.

In addition to this, the memory 113 is provided with a sorting destination information area 113*d* (the logical addresses thereof being x030 to x039).

The sorting destination information area 113*d* corresponds to the respective paper delivery trays 208-1, 208-2, . . . , and 208-10. Then, in the sorting destination information area 113*d*, the type or the characteristic character or number of the document to be sorted into a particular paper delivery tray 208 is written in.

Before starting the sorting process or the printing process involving sorting, any piece of valid information need not be written in each blank space of this sorting destination information area 113*d*. Therefore, the respective blank spaces have a content of, for example, "□□□" (meaning a blank space).

In the first embodiment, the length (L) of the document Da-1 along the direction of conveyance is used as the reference for sorting. A piece of information meaning this length L is written in the length 113*d*-1 blank space.

In addition, any particular one of the documents Da-2 to Da-10 that is different from the document Da-1 in length L is uniformly handled as "other", and therefore, in the length 113*d*-2 blank space, a piece of information meaning "other" (X in FIG. 4) is written in.

In addition, in FIG. 4, the area below the sorting destination information area 113*d* (the logical addresses thereof being x040 and the subsequent) is provided for still another purpose. However, the explanation thereof will be omitted here.

Figure 5:
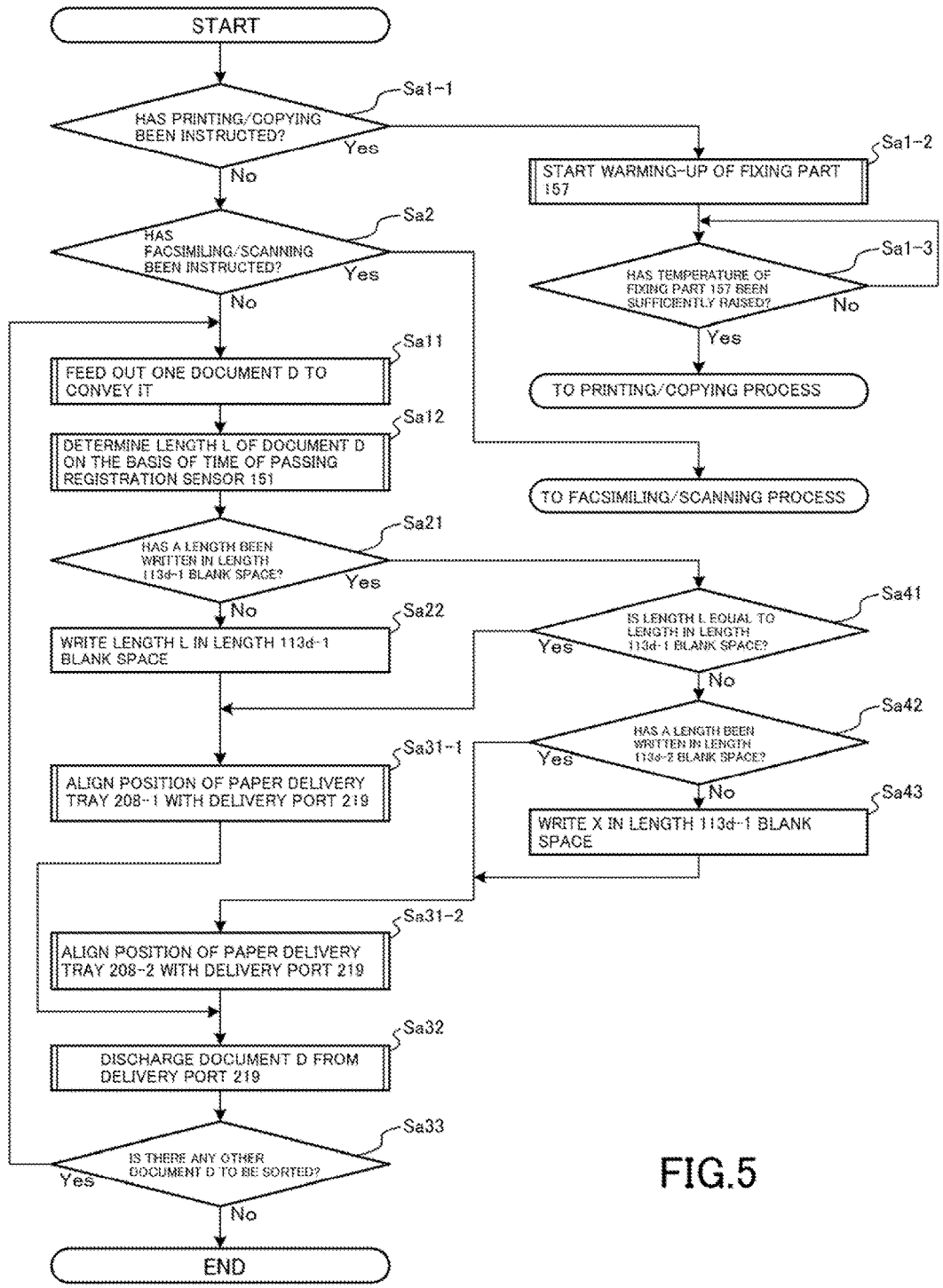
FIG. 5 is a flowchart illustrating the flow of processing in the first embodiment of the present disclosure.

The procedure for processing in the first embodiment will be specifically explained with reference to FIG. 5. In the first embodiment, as shown in FIG. 3A and FIG. 3B, the documents Da-1 to Da-10 having different sizes are accommodated in the paper feeding cassette 161 (161-1 or 161-2). When the process is instructed to be started by means of the "start key" (see FIG. 2) that is disposed in the keyboard 132, or the like, the operation is started.

At Step Sa1-1, the flow of the processing by the main body control part 110 varies depending upon whether or not the process that has been instructed to be started is either "printing" or "copying".

Here, in the case where start of either "printing" or "copying" has been instructed, the main body control part 110 starts warming up of the fixing part 157 at Step Sa1-2. At the same time, the main body control part 110 waits until the temperature of the fixing part 157 is sufficiently raised (Step Sa1-3).

In this way, with general MFPs (including a printer and a copying machine), a downtime exceeding a definite period of time will be introduced for electric power saving, or the like. Then, with quite a few MFPs, thereafter, even if either "printing" or "copying" is attempted to be executed, the operator will be forced to wait until the preparation operations, including cleaning and warming up of the respective components related to printing, such as the recording part, are completed.

However, the process according to the present disclosure is independent of such a process that involves waiting. Therefore, the process proceeds to the next step.

At the next Step Sa2, the flow of the processing by the main body control part 110 varies depending upon whether or not the process that has been instructed to be started is either "facsimiling" or "scanning".

Besides this, with some MFPs, and the like, inside maintenance or self-diagnosis can also be instructed to be started through the operation of the keyboard 132, or the like. However, in the present embodiment, for explanation, it is assumed that the process to be instructed besides "printing", "copying", "facsimiling" and "scanning" is limited to "sorting".

As the sorting process, the main body control part 110 first feeds out one document D from the paper feeding cassette 161 to feed it to the carrying passage 170 (Step Sa11).

Then, the time required for this document D to pass through the registration sensor 151 is measured. As described above, the amount of rotation of the registration roller pair 172 can be exactly grasped. Thus, from the time required for the document D to pass, the length L of the document D is calculated (Step Sa12).

Once the length of the document D has been calculated, in order to determine the size of that document D, the piece of information in the length 113*d*-1 blank space is read out from the sorting destination information area 113*d* in the memory 113. Then, if no piece of information has been written in the length 113*d*-1 blank space (Step Sa21), the length L that has been calculated is written in the length 113*d*-1 blank space (Step Sa22). In other words, a piece of information about a first size is written in the length 113*d*-1 blank space.

At this time, the size of the first document D that has been fed out from the paper feeding cassette 161 (the length L of the document Da-1) has been clarified.

Then, the main body control part 110 uses the elevating mechanism 220 in the post-processing mechanism 200 to align the position of the paper delivery tray 208-1 with the delivery port 219 (Step Sa31-1). Then, this document D is fed to the post-processing mechanism 200 through the paper discharging rollers 182*b*, after having been passed through the image forming part 150. The post-processing mechanism 200 discharges the document D to the paper delivery tray 208-1 through the delivery port 219, after having caused it to pass through the stock part 210 (Step Sa32).

After the document D having been discharged from the delivery port 219, the main body control part 110 terminates the process, if there is no other document D to be sorted in the paper feeding cassette 161. On the other hand, if there is a document D (Step Sa33), the process is returned to Step Sa11, and then next one document D is fed out, being fed to the carrying passage 170.

For the document Da-2 and the subsequent, in the case where, at the above-described Step Sa21, a piece of information has been written in the length 113$d$-1 blank space in the memory 113, the main body control part 110 compares the length L that has been calculated at Step Sa12 with the piece of information in the length 113$d$-1 blank space to determine whether or not they are equal to each other (Step Sa41). With reference to FIG. 3B, the document Da-1, the document Da-2, the document Da-4, and the like, are originally the same in size. However, not only the difference in material or the error at the time of cutting, but also the change with time, the difference in printed condition, or the like, often causes the calculated length L being not completely the same. In the present embodiment, if the difference between the length L and the piece of information in the length 113$d$-1 blank space is within the tolerance that is previously set, it is determined that the length L is equal to the piece of information in the length 113$d$-1 blank space.

If, at the above-described Step Sa41, the length L is equal to the piece of information in the length 113$d$-1 blank space, the process is shifted to Step Sa31-1. Then, the position of the paper delivery tray 208-1 is aligned with the delivery port 219.

On the other hand, if, at Step Sa41, the length L is different from the piece of information in the length 113$d$-1 blank space, then it is confirmed whether or not a piece of information has been written in the length 113$d$-2 blank space in the sorting destination information area 113$d$ (Step Sa42). If no piece of information has been written in, a piece of information that indicates the existence of a second size is written in the length 113$d$-2 blank space (Step Sa43).

In the first embodiment, the piece of information in the length 113$d$-2 blank space will not be used as the reference of comparison for length L. Therefore, the piece of information to be written in the length 113$d$-2 blank space may not have a special meaning (provided that it is not the same as "☐☐☐" at the time of starting the sorting process).

In this way, after a piece of information indicating the existence of a second size having been written in the length 113$d$-2 blank space (in the case where, at Step Sa42, the answer is Yes, i.e., a piece of information has already been written in the length 113$d$-2 blank space, there is no particular need for writing in), the main body control part 110 uses the elevating mechanism 220 in the post-processing mechanism 200 to align the position of the paper delivery tray 208-2 with the delivery port 219 (Step Sa31-2). Then, the process is shifted to Step Sa32.

Such a process is repeated for the documents Da-1 to Da-10. Once the sorting process has been terminated, these documents D, D . . . are accumulated on the paper delivery tray 208-1 or paper delivery tray 208-2 according to the size. The situation of the post-processing mechanism 200 at this time is shown in FIG. 6.

With reference to FIG. 3A, FIG. 3B and FIG. 6, since the documents Da-1, Da-2, Da-4, Da-6, Da-7, and Da-10 are the same in length L, they are accumulated on the paper delivery tray 208-1. Contrarily to this, the documents Da-3, Da-5, Da-8, and Da-9 are different in length L from the document Da-1, being accumulated on the paper delivery tray 208-2.

As the method in this first embodiment, a further simple sorting method can be adopted. In this case, for example, as the reference value for determining the length of the documents D, D . . . to be accommodated in the paper feeding cassette 161, a value of length that is middle between the different sizes (for example, 300) is written in the length 113$d$-1 blank space in the previously memory 113. Then, if the calculated length L of a document D is under the reference value, it may be sorted into the paper delivery tray 208-1, while, if the length L is over the reference value, it may be sorted into the paper delivery tray 208-2.

Second Embodiment

In the above-described first embodiment, the case where the documents D, D . . . having the same width and two different sizes are mixed has been explained. However, the present disclosure is not limited to this example, and even if two different sizes as described above, and still another size that is different from these two different sizes are mixed, the present disclosure allows sorting of documents. One example thereof will be explained in the second embodiment.

Figure 7A:
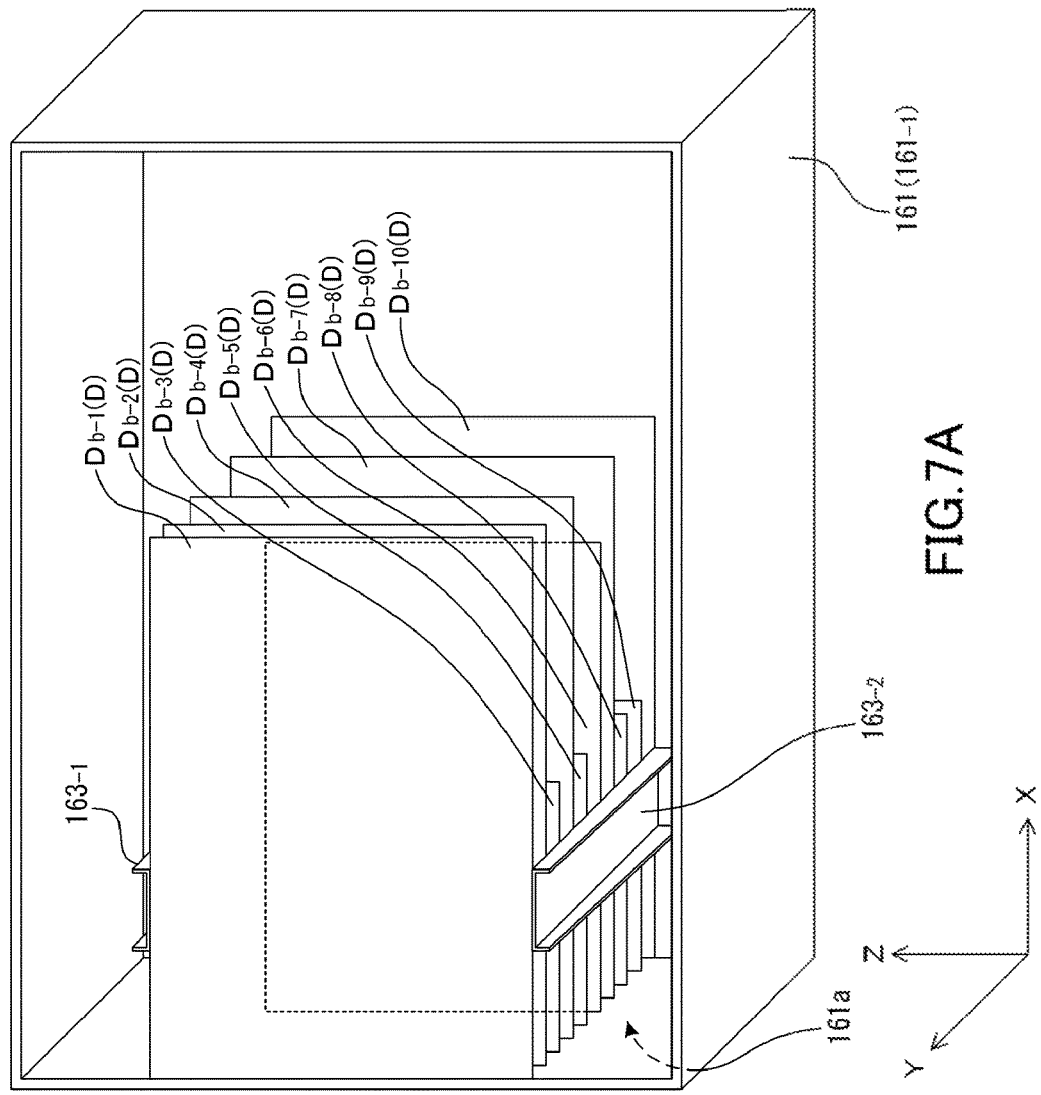
FIG. 7A is a figure explaining a paper sheet cassette in a second embodiment of the present disclosure and one example of the state of documents accommodated therein.

With the paper feeding cassette 161 shown in FIG. 7A, paper sheet guides 163-1 and 163-2, which are provided in the bottom part thereof, determine the paper sheet placement area width W. Between these paper sheet guide 163-1 and paper sheet guide 163-2, ten documents Db-1 to Db-10 having a width W or smaller than this width are placed with one edge part of each of them being aligned with the location of the feeding end 161$a$. FIG. 7B gives an example of detailed breakdown of the size and direction of these documents Db-1 to Db-10.

The "A3 longitudinal" and the "A4 lateral" given in FIG. 7B are as explained with reference to the above FIG. 3B. However, in FIG. 7A and FIG. 7B, a document Db-6 that does not fall under these two types of document is mixed.

The document Db-6 is slightly smaller than the A3 (longitudinal) in both width W and length L. Therefore, in the case where it is mixed in between internal layers of the documents D, D . . . as shown in FIG. 7, it may not be noticed.

By the way, for such documents or a bundle of documents, paper sheets having the standard sizes are often used. The standard sizes refer to the dimensions established by, for example, the ISO (International Organization for Standardization) or the JIS (Japanese Industrial Standard). FIG. 8 gives the typical numerical values for the "ISO A series" and the "JIS B series" that are often used as the standard sizes in general.

With the standard sizes given in FIG. 8, for example, even for the "ISO A4", which is particularly general, the combination of the width (W) with the length varies depending upon whether the paper sheet is used as a "A4 longitudinal" or a "A4 lateral" one. Then, in FIG. 8, the direction of whether it is longitudinal or lateral is not specified.

Here, with reference to FIG. 7B, for the documents Db-1 to Db-10, excluding Db-6, the "A3 longitudinal" means that the length is 420 mm and the width is 297 mm. On the other hand, the "A4 lateral" means that the length is 210 mm and the width is 297 mm.

In other words, in this way, for the standard sizes, if whether the direction is longitudinal or lateral is not mentioned, there is provided a relationship between two sizes that are the same in width W that the length for one of them is a double or a half of that for the other, in many cases (see FIG. 8).

Then, in this second embodiment, from a bundle of documents D, D . . . , in which three different sizes are mixed, the three different sizes being comprised of two standard sizes, which are the same in width W, and a size which does not belong to these two, the documents having the three different sizes will be sorted.

Figure 9:
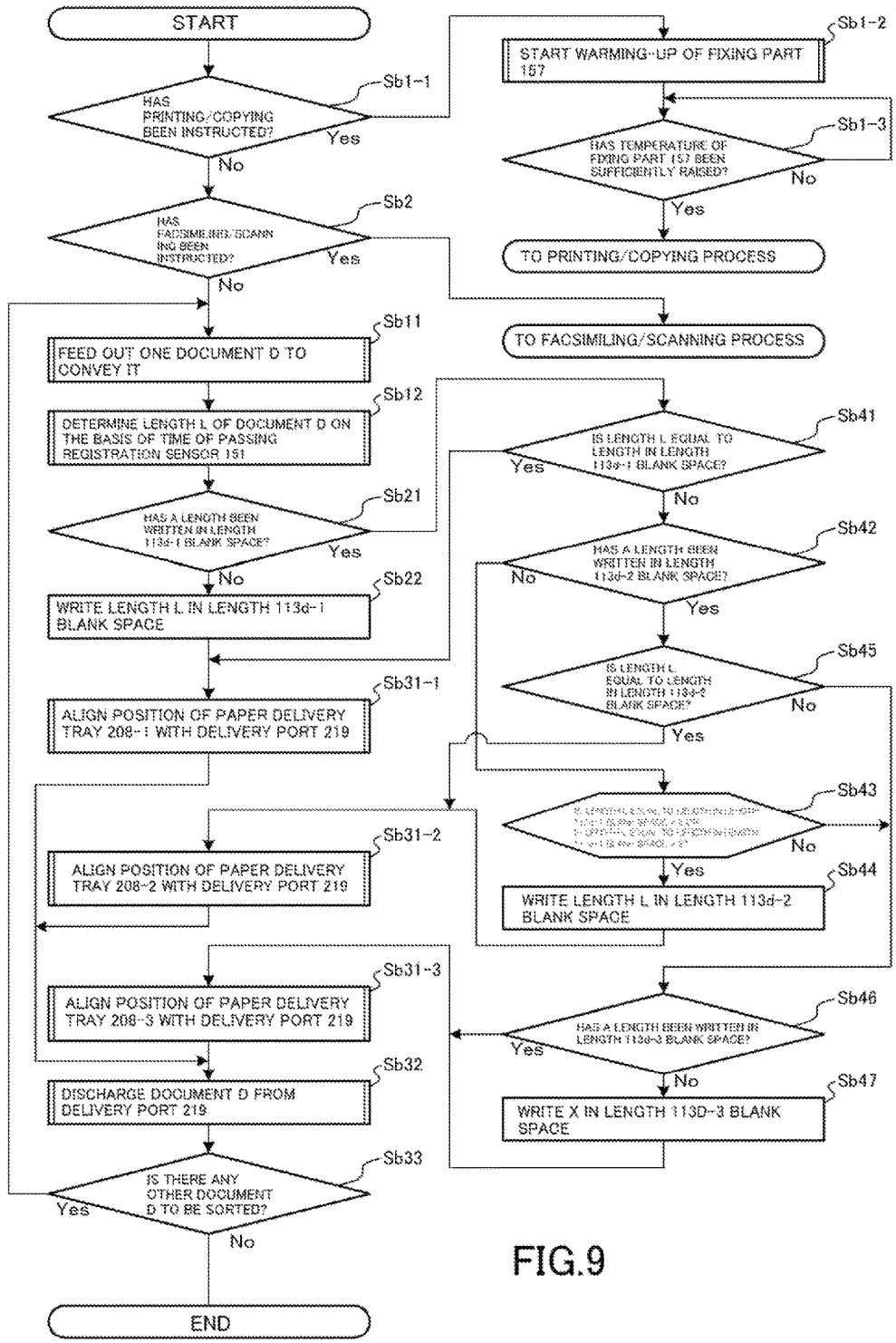
FIG. 9 is a flowchart illustrating the flow of processing in the second embodiment of the present disclosure.

The procedure for processing in the second embodiment will be specifically explained with reference to FIG. 9. In the second embodiment, as shown in FIG. 7A and FIG. 7B, the documents Db-1 to Db-10 having different sizes are accommodated in the paper feeding cassette 161 (161-1 or 161-2). When the process is instructed to be started by means of the "start key" (see FIG. 2) that is disposed in the keyboard 132, or the like, the operation is started.

At Step Sb1-1, the flow of the processing by the main body control part 110 varies depending upon whether or not the process that has been instructed to be started is either "printing" or "copying".

Here, in the case where start of either "printing" or "copying" has been instructed, the main body control part 110 starts warming up of the fixing part 157 at Step Sb1-2. At the same time, the main body control part 110 waits until the temperature of the fixing part 157 is sufficiently raised (Step Sb1-3).

In this way, with general MFPs (including a printer and a copying machine), a downtime exceeding a definite period of time will be introduced for electric power saving, or the like. Then, with quite a few MFPs, thereafter, even if the main body control part 110 attempts to execute either "printing" or "copying", it will be forced to wait until the preparation operations, including cleaning and warming up of the respective components related to printing, such as the recording part, are completed.

However, the process according to the present disclosure is independent of such a process that involves waiting. Therefore, the process proceeds to the next step.

At the next Step Sb2, the flow of the processing by the main body control part 110 varies depending upon whether or not the process that has been instructed to be started is either "facsimiling" or "scanning".

Besides this, with some MFPs, and the like, inside maintenance or self-diagnosis can also be instructed to be started through the operation of the keyboard 132, or the like. However, in the present embodiment, for explanation, it is assumed that the process to be instructed besides "printing", "copying", "facsimiling" and "scanning" is limited to "sorting".

As the sorting process, the main body control part 110 first feeds out one document D from the paper feeding cassette 161 to feed it to the carrying passage 170 (Step Sb11).

Then, the time required for this document D to pass through the registration sensor 151 is measured. As described above, the amount of rotation of the registration roller pair 172 can be exactly grasped. Thus, from the time required for the document D to pass, the length L of the document D is calculated (Step Sb12).

Once the length of the document D has been calculated, in order to determine the size of that document D, the piece of information in the length 113d-1 blank space is read out from the sorting destination information area 113d in the memory 113 (see FIG. 4). Then, if no piece of information has been written in the length 113d-1 blank space (Step Sb21), the length L that has been calculated is written in the length 113d-1 blank space (Step Sb22). In other words, a piece of information about a first size is written in the length 113d-1 blank space.

At this time, the size of the first document D that has been fed out from the paper feeding cassette 161 (the length L of the document Db-1) has been clarified.

Then, the main body control part 110 uses the elevating mechanism 220 in the post-processing mechanism 200 to align the position of the paper delivery tray 208-1 with the delivery port 219 (Step Sb31-1). Simultaneously with this, this document D is fed to the post-processing mechanism 200 through the paper discharging rollers 182b, after having been passed through the image forming part 150. The post-processing mechanism 200 discharges the document D to the paper delivery tray 208-1 through the delivery port 219, after having caused it to pass through the stock part 210 (Step Sb32).

After the document D having been discharged from the delivery port 219, the main body control part 110 terminates the process, if there is no other document D to be sorted in the paper feeding cassette 161. On the other hand, if there is a document D (Step Sb33), the process is returned to Step Sb11. Then, next one document D is fed out, being fed to the carrying passage 170.

For the document Db-2 and the subsequent, in the case where, at the above-described Step Sb21, a piece of information in the length 113d-1 blank space has been written in the memory 113, the main body control part 110 compares the length L that has been calculated at Step Sb12 with the piece of information in the length 113d-1 blank space to determine whether or not they are equal to each other (Step Sb41). Also in the present embodiment, if the difference between the length L and the piece of information in the length 113d-1 blank space is within the tolerance that is previously set, it is determined that the length L is equal to the piece of information in the length 113d-1 blank space.

If, at the above-described Step Sb41, the length L is equal to the piece of information in the length 113d-1 blank space, the process is shifted to Step Sb31-1. Then, the position of the paper delivery tray 208-1 is aligned with the delivery port 219, and thereafter the process is shifted to Step Sb32.

On the other hand, if, at Step Sb41, the length L is different from the piece of information in the length 113d-1 blank space, then it is confirmed whether or not a piece of information has been written in the length 113d-2 blank space in the sorting destination information area 113d (Step Sb42).

If, at Step Sb42, no piece of information has been written in the length 113d-2 blank space, it is confirmed at the next Step Sb43 whether or not the length L is equal to a double or a half of the length in the length 113d-1 blank space.

Also at this Step Sb43, if the difference between the length L and a double of the length in the length 113d-1 blank space is within the tolerance that is previously set, it is determined that the length L is equal to a double of the length in the length 113d-1 blank space. On the other hand, if the difference between the length L and a half of the length in the length 113d-1 blank space is within the tolerance that is previously set, it is determined that the length L is equal to a half of the length in the length 113d-1 blank space.

If, at this Step Sb43, the length L is equal to a double or a half of the length in the length 113d-1 blank space, the length L is written in the length 113d-2 blank space (Step Sb44). Thereafter, the position of the paper delivery tray 208-1 is aligned with the delivery port 219 (Step Sb31-2), and the process is shifted to Step Sb32.

At the above Step Sb42, in the case where a piece of information has been written in the length 113d-2 blank space, it is compared at Step Sb45 whether or not the length L is equal to the piece of information in the length 113d-2 blank space (also Step Sb45, if the difference between the length L and the piece of information in the length 113*d*-2 blank space is within the tolerance that is previously set, it is determined that the length L and the piece of information in the length 113*d*-2 blank space is equal to each other).

If, at this Step Sa45, the length L is equal to the piece of information in the length 113*d*-2 blank space, the process is shifted to Step Sa31-2, and the position of the paper delivery tray 208-2 is aligned with the delivery port 219; thereafter, the process is shifted to Step Sb32.

In addition, in the case where, at Step Sb43, the length L is not equal to either a double or a half of the length in the length 113*d*-1 blank space, or in the case where, at Step Sb45, the length L is not equal to the length in the length 113*d*-2 blank space, it is then confirmed whether or not a piece of information has been written in the length 113*d*-3 blank space in the sorting destination information area 113*d* (Step Sb46).

If, at Step Sb46, no piece of information has been written in the length 113*d*-3 blank space, a piece of information that indicates the existence of a size not belonging to the two standard sizes is written in the length 113*d*-3 blank space (Step Sb47).

In the second embodiment, the piece of information in the length 113*d*-3 blank space will not be used as the reference of comparison for length L. Therefore, the piece of information to be written in the length 113*d*-3 blank space may not have a special meaning (provided that it is not the same as "□□□" at the time of starting the sorting process).

In this way, a piece of information indicating the existence of a size not belonging to the two standard sizes is written in the length 113*d*-3 blank space. Thereafter (in the case where, at Step Sa46, a piece of information has already been written in the length 113*d*-3 blank space, there is no particular need for writing in), the main body control part 110 uses the elevating mechanism 220 in the post-processing mechanism 200 to align the position of the paper delivery tray 208-3 with the delivery port 219 (Step Sa31-3), and the process is shifted to Step Sb32.

Such a process is repeated for the documents Da-1 to Da-10. Once the sorting process has been terminated, these documents D, D . . . are accumulated on the paper delivery trays 208-1 to 208-3 according to the size. The situation of the post-processing mechanism 200 at this time is shown in FIG. 10.

Figure 10:
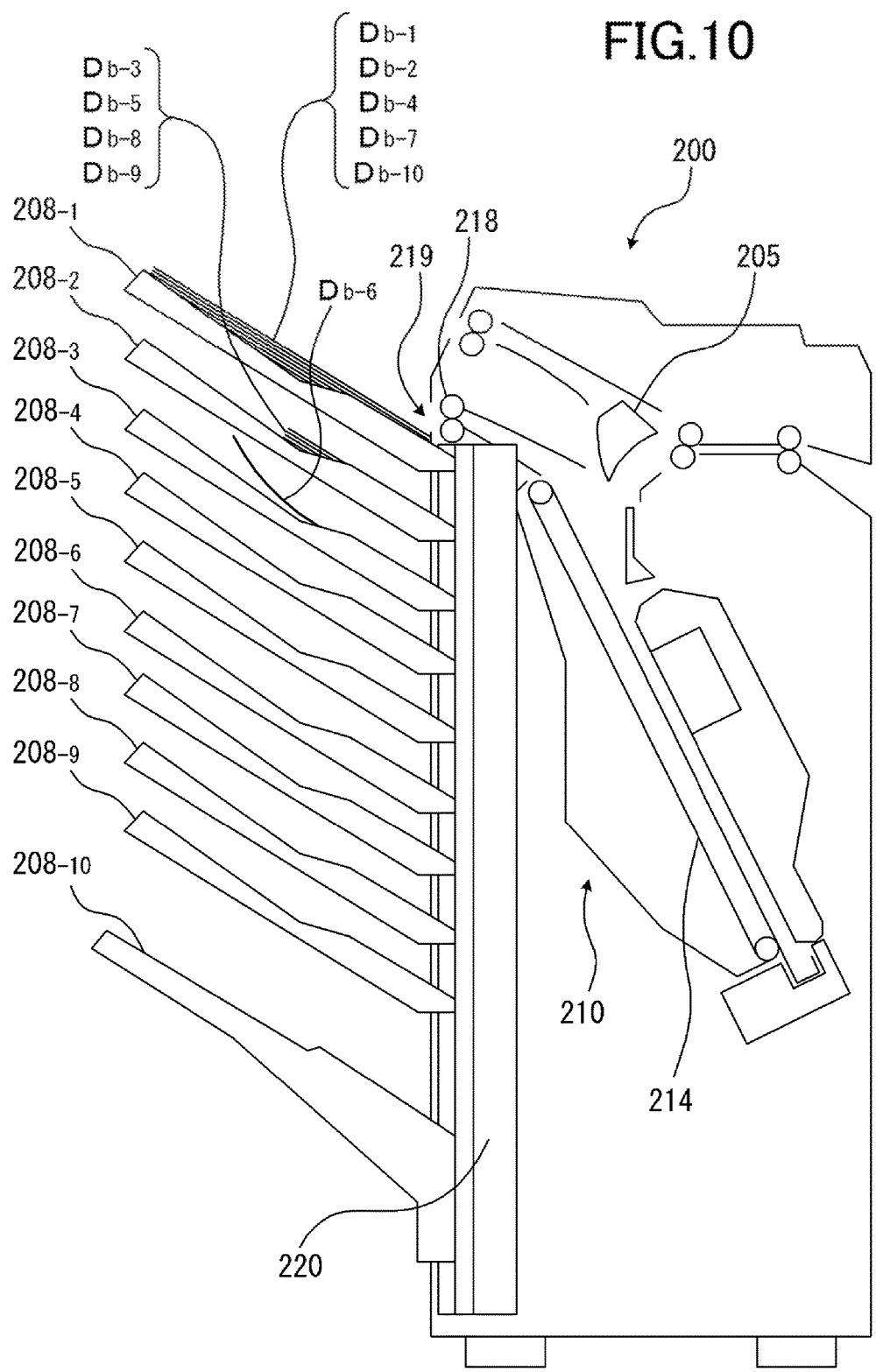
FIG. 10 is a figure explaining one example of the state of a post-processing mechanism and documents after a sorting process in the second embodiment of the present disclosure having been performed.

With reference to FIG. 7A, FIG. 7B, and FIG. 10, since the documents Da-1, Da-2, Da-4, Da-7, and Da-10 are the same in length L, they are accumulated on the paper delivery tray 208-1. Since the documents Da-3, Da-5, Da-8, and Da-9 are the same in length L, they are accumulated on the paper delivery tray 208-2. However, since the document Db-6 has a standard size different from the two ones that have been previously encountered, it is discharged onto the paper delivery tray 208-3.

Third Embodiment

In the above-described second embodiment, by focusing on the feature of the standard sizes as given in FIG. 8, in other words, the feature that, between two sizes that are the same in width W, there is provided a relationship that the length for one of them is a double or a half of that for the other, in many cases, the documents D, D . . . are sorted. In this case, for the documents D, D . . . that are the same in size with the document Db-1 and the documents D, D . . . that are the same in width W with the document Db-1, pieces of information that indicate the lengths L are written in the sorting destination information area 113*d*.

Then, if the designations of the standard sizes that have the lengths L can be grasped, it can be displayed at the time when the sorting process has been terminated what sizes of documents have been discharged onto the respective paper delivery trays 208, 208 . . . . The third embodiment is an example in which such a process can be performed.

Here, the contents that are recorded in the memory 113 in the third embodiment will be explained. FIG. 11 gives a relationship between the address and the data for the memory 113. In FIG. 11, the relationship between a particular area and the location is indicated with a logical address, and therefore, the size (for example, the number of bytes) of data for one unit of address varies depending upon the contents. In addition, in case where the physical addresses (not given in FIG. 11) are investigated, a set of data (for example, the values of length for the standard sizes) may be distributed in a plurality of physical address areas that are not continued.

In the memory 113, there are provided, for example, a program area 113*a* (the logical addresses thereof being x000 to x009) for recording a program for the MFP 1 to control the operation; a various setting information area 113*b* (the logical addresses thereof being x010 to x019) for recording the environmental information for use of the image forming apparatus of the present disclosure as an MFP (the installation region, the FAX number, the sizes of recording papers to be accommodated, the setting of the back light in the operation part 130, and the like); and an image data area 113*c* (the logical addresses thereof being x020 to x029) for rearranging or temporary storage of image data.

In addition to this, the memory 113 is provided with a sorting destination information area 113*d* (the logical addresses thereof being x030 to x039).

The sorting destination information area 113*d* corresponds to the respective paper delivery trays 208-1, 208-2, . . . , and 208-10, and in the sorting destination information area 113*d*, the type or the characteristic character or number of the document to be sorted into a particular paper delivery tray 208 are written in.

Before starting the sorting process or the printing process involving sorting, any piece of valid information need not be written in each blank space of this sorting destination information area 113*d*. Therefore, the respective blank spaces have a content of, for example, "□□□".

In the third embodiment, a piece of information meaning the length L related to a first size is written in the length 113*d*-1 blank space, and a piece of information meaning the length L related to a second size is written in the length 113*d*-2 blank space.

In addition, any particular size not belonging to either the size related to the piece of information in the length 113*d*-1 blank space or the size related to the piece of information in the 113*d*-2 blank space is uniformly handled as "other". Then, in the length 113*d*-3 blank space, apiece of information meaning "other" (X in FIG. 11) is written in.

For the memory 113, in the third embodiment, a size storage area 113*e* (the logical addresses thereof being x040 to x049) is additionally provided. The size storage area 113*e* is divided into blank spaces for a plurality of paper sheet sizes (document sizes), and in the respective blank spaces, a piece of information meaning the length of the longer side and that meaning the length of the shorter side for each size (in the case where it is presumed that the paper sheet is in the rectangular shape) is written in.

The respective pieces of information in the size storage area 113e are written in when the MFP 1 is provided with a document sorting function as an optional. Therefore, they will not normally be rewritten.

In addition, in FIG. 11, the area below the sorting destination information area 113e (the logical addresses thereof being x050 and the subsequent) is provided for still another purpose. However, the explanation thereof will be omitted here.

The procedure for processing in the third embodiment will be specifically explained with reference to FIG. 12. Also in the third embodiment, as shown in FIG. 7 (the paper feeding cassette being the same as that in the second embodiment), the documents Da-1 to Da-10 having different sizes are accommodated in the paper feeding cassette 161 (161-1 or 161-2). When the process is instructed to be started by means of the "start key" (see FIG. 2) that is disposed in the keyboard 132, or the like, the operation is started.

At Step Sc1-1, the flow of the processing by the main body control part 110 varies depending upon whether or not the process that has been instructed to be started is either "printing" or "copying".

Here, in the case where start of either "printing" or "copying" has been instructed, the main body control part 110 starts warming up of the fixing part 157 at Step Sc1-2. At the same time, the main body control part 110 waits until the temperature of the fixing part 157 is sufficiently raised (Step Sc1-3).

In this way, with general MFPs (including a printer and a copying machine), a downtime exceeding a definite period of time will be introduced for electric power saving, or the like. Then, with quite a few MFPs, thereafter, even if the main body control part 110 attempts to execute either "printing" or "copying", it will be forced to wait until the preparation operations, including cleaning and warming up of the respective components related to printing, such as the recording part, are completed.

However, the process according to the present disclosure is independent of such a process that involves waiting. Therefore, the process proceeds to the next step.

At the next Step Sc2, the flow of the processing by the main body control part 110 varies depending upon whether or not the process that has been instructed to be started is either "facsimiling" or "scanning".

Besides this, with some MFPs, and the like, inside maintenance or self-diagnosis can also be instructed to be started through the operation of the keyboard 132, or the like. However, in the present embodiment, for explanation, it is assumed that the process to be instructed besides "printing", "copying", "facsimiling" and "scanning" is limited to "sorting".

As the sorting process, the main body control part 110 first feeds out one document D from the paper feeding cassette 161 to feed it to the carrying passage 170 (Step Sc11).

Then, the time required for this document D to pass through the registration sensor 151 is measured. As described above, the amount of rotation of the registration roller pair 172 can be exactly grasped. Thus, from the time required for the document D to pass, the length L of the document D is calculated (Step Sc12).

Once the length of the document D has been calculated, in order to determine the size of that document D, the piece of information in the length 113d-1 blank space is read out from the sorting destination information area 113d (see FIG. 4) in the memory 113. Then, if no piece of information has been written in the length 113d-1 blank space (Step Sc21), the length L that has been calculated is written in the length 113d-1 blank space (Step Sc22). In other words, apiece of information about a first size is written in the length 113d-1 blank space.

At this time, the size of the first document D that has been fed out from the paper feeding cassette 161 (the length L of the document Db-1) has been clarified.

Then, the main body control part 110 uses the elevating mechanism 220 in the post-processing mechanism 200 to align the position of the paper delivery tray 208-1 with the delivery port 219 (Step Sc31-1). Simultaneously with this, this document D is fed to the post-processing mechanism 200 through the paper discharging rollers 182b, after having been passed through the image forming part 150. The post-processing mechanism 200 discharges the document D to the paper delivery tray 208-1 through the delivery port 219, after having caused it to pass through the stock part 210 (Step Sc32).

After the document D having been discharged from the delivery port 219, the main body control part 110 terminates the process, if there is no other document D to be sorted in the paper feeding cassette 161. On the other hand, if there is a document D (Step Sc33), the process is returned to Step Sc11, and then, next one document D is fed out, being fed to the carrying passage 170.

For the document Db-2 and the subsequent, in the case where, at the above-described Step Sc21, apiece of information has been written in the length 113d-1 blank space in the memory 113, the main body control part 110 compares the length L that has been calculated at Step Sc12 with the piece of information in the length 113d-1 blank space to determine whether or not they are equal to each other (Step Sc41). Also here, if the difference between the length L and the piece of information in the length 113d-1 blank space is within the tolerance that is previously set, it is determined that the length L is equal to the piece of information in the length 113d-1 blank space.

If, at the above-described Step Sc41, the length L is equal to the piece of information in the length 113d-1 blank space, the process is shifted to Step Sc31-1; then, the position of the paper delivery tray 208-1 is aligned with the delivery port 219, and thereafter the process is shifted to Step Sc32.

On the other hand, if, at Step Sc41, the length L is different from the piece of information in the length 113d-1 blank space, then it is confirmed whether or not a piece of information has been written in the length 113d-2 blank space in the sorting destination information area 113d (Step Sc42).

If, at Step Sc42, no piece of information has been written in the length 113d-2 blank space, it is confirmed at the next Step Sc43 whether or not the length L is equal to a double or a half of the length in the length 113d-1 blank space.

Also at this Step Sc43, if the difference between the length L and a double of the length in the length 113d-1 blank space is within the tolerance that is previously set, it is determined that the length L is equal to a double of the length in the length 113d-1 blank space. On the other hand, if the difference between the length L and a half of the length in the length 113d-1 blank space is within the tolerance that is previously set, it is determined that the length L is equal to a half of the length in the length 113d-1 blank space.

If, at this Step Sc43, the length L is equal to a double or a half of the length in the length 113d-1 blank space, the length L is written in the length 113d-2 blank space (Step Sc44).

At these Step Sc43 and Step Sc44, the length in the length 113d-1 blank space and the length in the length 113d-2 blank space are established. Therefore, if the width W of the documents D, D . . . is uniform, the size of a document to be discharged onto the paper delivery tray 208-1 and the size of a document to be discharged onto the paper delivery tray 208-2 are derived of itself.

Then, the size designation of a document to be discharged onto the paper delivery tray 208-1 and the size designation of a document to be discharged onto the paper delivery tray 208-2 are retrieved from the size storage area 113e (see FIG. 11), and these are displayed on the display 131 (Step Sc45).

Thereafter, the position of the paper delivery tray 208-2 is aligned with the delivery port 219 (Step Sc31-2), and the process is shifted to Step Sc32.

At the above Step Sc42, in the case where a piece of information has been written in the length 113d-2 blank space, it is compared at Step Sc46 whether or not the length L is equal to the piece of information in the length 113d-2 blank space (also Step Sc46, if the difference between the length L and the piece of information in the length 113d-2 blank space is within the tolerance that is previously set, it is determined that the length L and the piece of information in the length 113d-2 blank space is equal to each other).

If, at this Step Sc45, the length L is equal to the piece of information in the length 113d-2 blank space, the process is shifted to Step Sc31-2, and the position of the paper delivery tray 208-2 is aligned with the delivery port 219; thereafter, the process is shifted to Step Sc32.

In addition, in the case where, at Step Sc43, the length L is not equal to either a double or a half of the length in the length 113d-1 blank space, or in the case where, at Step Sc46, the length L is not equal to the length in the length 113d-2 blank space, it is then confirmed whether or not a piece of information has been written in the length 113d-3 blank space in the sorting destination information area 113d (Step Sc47).

If, at Step Sc47, no piece of information has been written in the length 113d-3 blank space, a piece of information that indicates the existence of a size not belonging to the two standard sizes is written in the length 113d-3 blank space (Step Sc48). Simultaneously with this, as a piece of information for the size of a document to be discharged onto the paper delivery tray 208-3, a string of "other", or the like, is displayed on the display 131 (Step Sc49).

Also in the third embodiment, the piece of information in the length 113d-3 blank space will not be used as the reference of comparison for length L. Therefore, the piece of information to be written in the length 113d-3 blank space may not have a special meaning (provided that it is not the same as "□□□" given at the time of starting the sorting process).

After these processes at Step Sc48 and Step Sc49 (in the case where, at Step Sc47, a piece of information has already been written in the length 113d-3 blank space, Step Sc48 and Sc49 are not required), the main body control part 110 uses the elevating mechanism 220 in the post-processing mechanism 200 to align the position of the paper delivery tray 208-3 with the delivery port 219 (Step Sc31-3). Thereafter, the process is shifted to Step Sc32.

Such a process is repeated for the documents Da-1 to Da-10. Once the sorting process has been terminated, these documents D, D . . . are accumulated on the paper delivery trays 208-1 to 208-3 according to the size. The situation of the post-processing mechanism 200 at this time is shown in FIG. 10.

In addition to this, in the third embodiment, as shown in FIG. 13, on the display 131 that is disposed in the operation part 130, the size designations of the documents D, D . . . that are to be discharged onto the paper delivery tray 208, 208, . . . are displayed.

With some MFPs 1, the width W of the paper sheet can be grasped by means of the positions of the paper sheet guides 163-1 and 163-2 that are provided in the bottom part of the paper feeding cassette 161.

In such a case, as in the third embodiment, if pieces of information about a plurality of paper sheet sizes are written in the size storage area 113e in the memory 113, at the point of time when a document D the width W and the length L of which come under any one of the paper sheet size first appears, the two sizes that have the width W are derived. At this time, the sizes (lengths) of documents to be discharged onto the paper delivery trays 208-1 and 208-2 may be determined.

Fourth Embodiment

In the above-described second and third embodiments, even if documents of two sizes having the same width W and "other" size are mixed, the documents can be sorted by size.

In the following fourth embodiment, even if, besides documents of a plurality of sizes having the same width W, documents of a plurality of sizes having widths different from the width W (having widths smaller than the width W) are mixed, the documents can be sorted into particulars by size.

With the paper feeding cassette 161 shown in FIG. 14A, paper sheet guides 163-1 and 163-2, which are provided in the bottom part thereof, determine the paper sheet placement area width W. Between these paper sheet guide 163-1 and paper sheet guide 163-2, ten documents Db-1 to Db-10 having a width W or smaller than this width are placed with one edge part of each of them being aligned with the location of the feeding end 161a. FIG. 14B gives an example of detailed breakdown of the size and direction of these documents Db-1 to Db-10.

The "A3 longitudinal" and the "A4 lateral" given in FIG. 14B are as explained with reference to the above FIG. 3B and FIG. 7B. However, in FIG. 14A and FIG. 14B, documents Dd-6 and Dd-8 that do not fall under these two types of document are mixed.

The document Db-6 is slightly smaller than the A3 (longitudinal) in both width W and length L, while the document Db-8 is slightly smaller than the A4 (lateral) in width W. Therefore, in the case where the documents Db-6 and Db-8 are mixed in between internal layers of the documents D, D . . . as shown in FIG. 14A, they may not be noticed.

In the fourth embodiment, in sorting the documents D, D . . . by the length L thereof, the range to which the value of length of the respective sizes of the documents D, D . . . belongs, rather than the value of length of the respective sizes thereof, is assumed. Then, the boundary value (threshold value) of such range is previously written in the memory 113.

Here, the contents that are recorded in the memory 113 in the fourth embodiment will be explained. FIG. 15 gives a relationship between the address and the data for the memory 113. In FIG. 15, the relationship between a particular area and the location is indicated with a logical address, and therefore, the size (for example, the number of bytes) of data for one unit of address varies depending upon the content. In addition, in case where the physical addresses (not given in FIG. 15) are investigated, a set of data (for example, the values of length for the standard sizes) may be distributed in a plurality of physical address areas that are not continued.

In the memory 113, there are provided, for example, a program area 113*a* (the logical addresses thereof being x000 to x009) for recording a program for the MFP 1 to control the operation; a various setting information area 113*b* (the logical addresses thereof being x010 to x019) for recording the environmental information for use of the image forming apparatus of the present disclosure as an MFP (the installation region, the FAX number, the sizes of recording papers to be accommodated, the setting of the back light in the operation part 130, and the like); and an image data area 113*c* (the logical addresses thereof being x020 to x029) for rearranging or temporary storage of image data.

In addition to this, the memory 113 is provided with a sorting destination information area 113*d* (the logical addresses thereof being x030 to x039).

In the sorting destination information area 113*d*, the length 113*d*-1, 113*d*-2, . . . , 113-10 blank spaces that respectively correspond to the paper delivery trays 208-1, 208-2, . . . , and 208-10 are provided, and in each of the blank spaces, a piece of information meaning the upper limit value (threshold value) of the length of the document is written in (in mm, for example).

In the respective blank spaces in the sorting destination information area 113*d*, the numerical value is increased from the length 113*d*-1 blank space, which is located in the uppermost line of the sorting destination information area 113*d* in FIG. 15, toward the blank spaces in the lower lines. In the blank space for the length that exceeds a value that is assumed as a maximum threshold value of the length of a document to be sorted, a piece of information meaning that the length exceeds the upper limit is written in (a piece of information that is not valid as a numerical value is used, and in FIG. 15, Y is written in the length 113*d*-4 blank space, and in the subsequent blank spaces, "☐☐☐" is kept as being given).

In the fourth embodiment, the pieces of information in the respective blank spaces in the sorting destination information area 113*d* are previously set when the MFP 1 is provided with a document sorting function as an optional, and are not to be successively rewritten during the sorting process or the printing process involving sorting. However, at the time of the sorting process, the user of the MFP 1 can temporarily rewrite a piece of information or add another piece of information.

In addition, in FIG. 15, the area below the sorting destination information area 113*d* (the logical addresses thereof being x040 and the subsequent) is provided for still another purpose. However, the explanation thereof will be omitted here.

Figure 16:
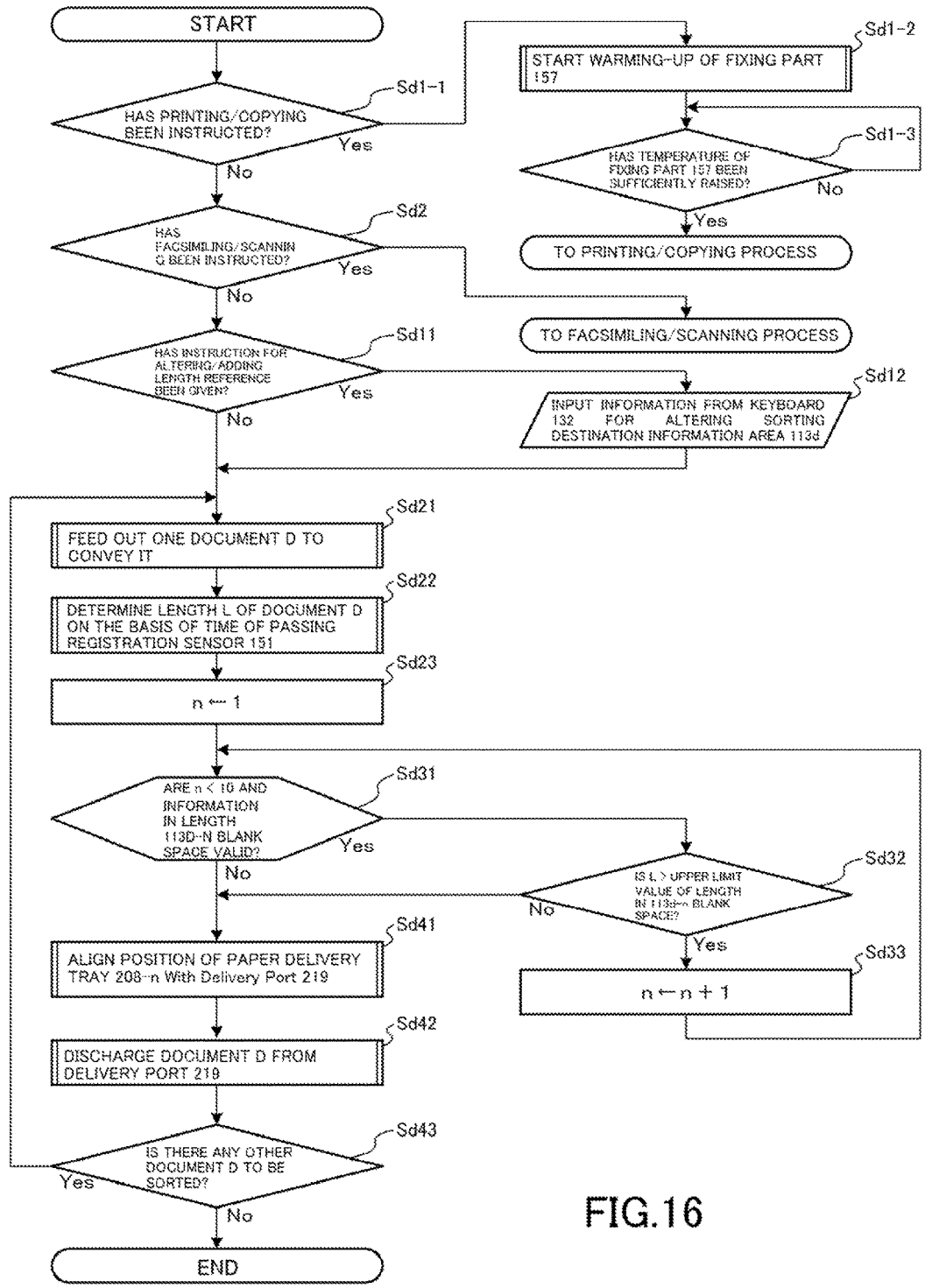
FIG. 16 is a flowchart illustrating the flow of processing in the fourth embodiment of the present disclosure.

The procedure for processing in the fourth embodiment will be specifically explained with reference to FIG. 16. In the third embodiment, as shown in FIG. 14, the documents Da-1 to Da-10 having different sizes are accommodated in the paper feeding cassette 161 (161-1 or 161-2). Then, when the process is instructed to be started by means of the "start key" (see FIG. 2) that is disposed in the keyboard 132, or the like, the operation is started.

At Step Sd1-1, the flow of the processing by the main body control part 110 varies depending upon whether or not the process that has been instructed to be started is either "printing" or "copying".

Here, in the case where start of either "printing" or "copying" has been instructed, the main body control part 110 starts warming up of the fixing part 157 at Step Sd1-2.

At the same time, the main body control part 110 waits until the temperature of the fixing part 157 is sufficiently raised (Step Sd1-3).

In this way, with general MFPs (including a printer and a copying machine), a downtime exceeding a definite period of time will be introduced for electric power saving, or the like. Then, with quite a few MFPs, thereafter, even if the main body control part 110 attempts to execute either "printing" or "copying", it will be forced to wait until the preparation operations, including cleaning and warming up of the respective components related to printing, such as the recording part, are completed.

However, the process according to the present disclosure is independent of such a process that involves waiting. Therefore, the process proceeds to the next step.

At the next Step Sd2, the flow of the processing by the main body control part 110 varies depending upon whether or not the process that has been instructed to be started is either "facsimiling" or "scanning".

Besides this, with some MFPs, and the like, inside maintenance or self-diagnosis can also be instructed to be started through an operation of the keyboard 132, or the like. However, in the present embodiment, for explanation, it is assumed that the process to be instructed besides "printing", "copying", "facsimiling" and "scanning" is limited to "sorting".

The main body control part 110 confirms whether or not the user of the MFP 1 has given a request for rewriting a piece of information in a particular blank space in the above-described sorting destination information area 113*d* prior to the sorting process (Step Sd11).

If the user of the MFP 1 has given a request for rewriting a piece of information in a particular blank space in the above-described sorting destination information area 113*d*, the main body control part 110 waits for a piece of information being inputted from the keyboard 132 in the operation part 130, or the like. Upon an input having been given, the piece of information inputted is written in the particular blank space in the sorting destination information area 113*d* (Step Sd12).

The details of operation of inputting such a piece of information and that of writing-in thereof in the memory 113 are general ones. Therefore, explanation thereof will be omitted here.

In addition, the case in which such a rewriting operation is considered to be effective in the fourth embodiment will be described later. Hereinafter, everything will be explained on the assumption that the contents in FIG. 15 have been altered as given in FIG. 17.

As the sorting process, (with reference to FIG. 16), the main body control part 110 first feeds out one document D from the paper feeding cassette 161 to feed it to the carrying passage 170 (Step Sd21).

Then, the time required for this document D to pass through the registration sensor 151 is measured. As described above, the amount of rotation of the registration roller pair 172 can be exactly grasped. Thus, from the time required for the document D to pass, the length L of the document D is calculated (Step Sd22).

Here, the value of n, which indicates that the length L that has been calculated is to be compared with the upper limit value of length in the nth length 113*d* blank space, is set at 1 (Step Sd23).

Then, the main body control part 110 confirm whether or not the value of n is under the total number of stages of the paper delivery trays 208, 208, . . . (which is 10 in the present embodiment), and a piece of valid information (a numerical value) is written in the length 113*d-n* blank space blank space (Step Sd31). If the conditions are met, it is compared whether or not the length L that has been calculated exceeds the upper limit value of length in the length 113*d-n* blank space (Step Sd32).

In the above-described Step Sd32, in the case where the length L exceeds the upper limit value of length in the length 113*d-n* blank space, 1 is added to the value of n, and the process is returned to Step Sd31.

On the other hand, at Step Sd32, in the case where the length L is equal to or under the upper limit value of length in the length 113*d-n* blank space or in the case where, at the above Step Sd31, the conditions have not been met, the main body control part 110 uses the elevating mechanism 220 in the post-processing mechanism 200 to align the position of the paper delivery tray 208-*n* with the delivery port 219 (Step Sd41). Simultaneously with this, this document D is fed to the post-processing mechanism 200 through the paper discharging rollers 182*b*, after having been passed through the image forming part 150. The post-processing mechanism 200 discharges the document D to the paper delivery tray 208-*n* through the delivery port 219, after having caused it to pass through the stock part 210 (Step Sd42).

After the document D having been discharged from the delivery port 219, the main body control part 110 terminates the process, if there is no other document D to be sorted in the paper feeding cassette 161. On the other hand, if there is a document D (Step Sd43), the process is returned to Step Sd21, and then, next one document D is fed out, being fed to the carrying passage 170.

As one example of the case where the bundle of documents D, D . . . shown in FIG. 14A and FIG. 14B are to be sorted on the reference that is indicated in the sorting destination information area 113*d* shown in FIG. 17, it is assumed that the document Dd-1 has a length L of 420 (mm); then, for the values of n of 1 to 3, the conditions are not met at Step Sd31. However, when the value of n is 4, the length 113*d*-4 blank space provides Y, which is not valid as a numerical value, thereby the document Dd-1 is discharged onto the paper delivery tray 208-4.

As another example, it is assumed that the document Dd-6 has a length L of 182 (mm), then when the value of n is 1, the conditions are met at Step Sd31 (see FIG. 17). Therefore, the document Dd-6 is discharged onto the paper delivery tray 208-1.

Figure 18A:
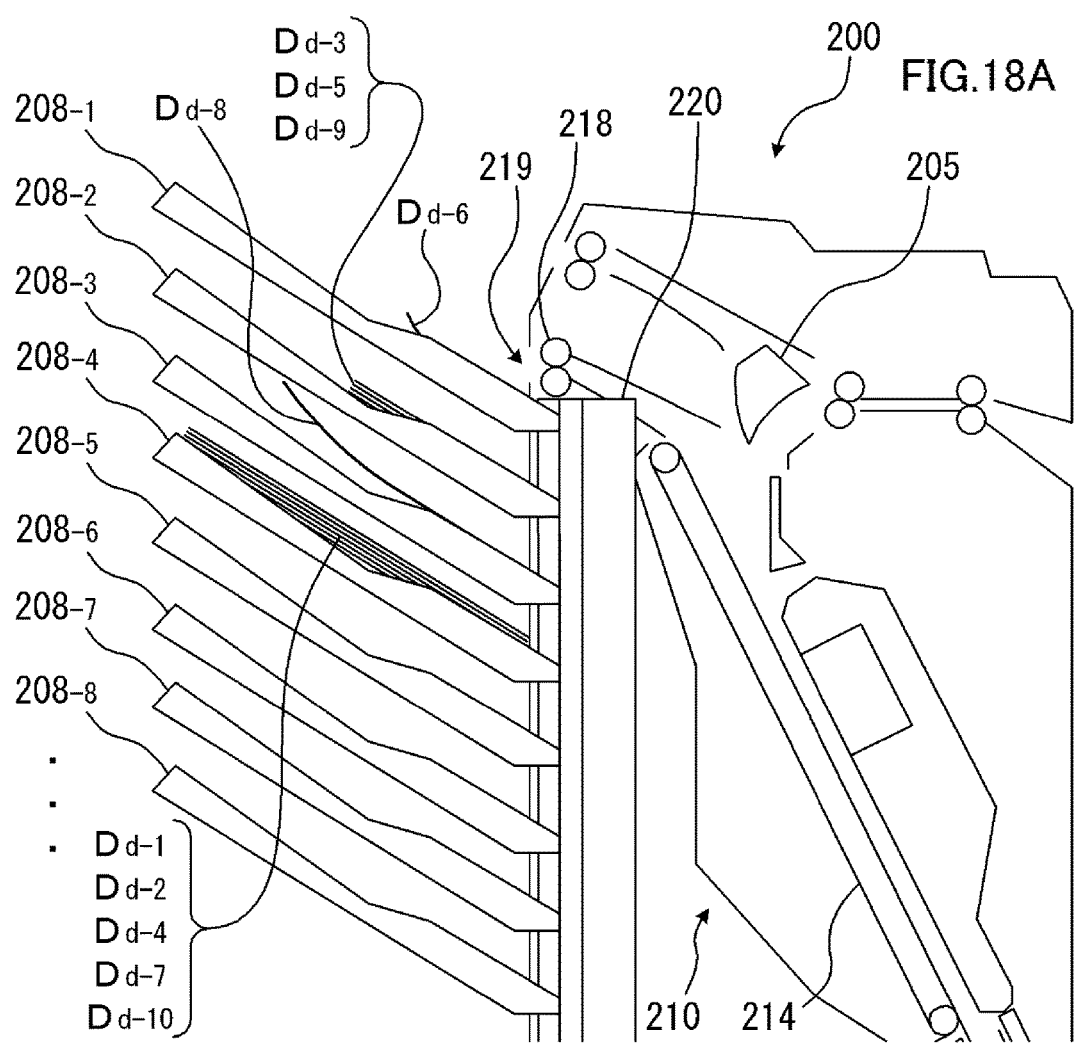
FIG. 18A is a figure (memory map) explaining one example of the state of a post-processing mechanism and documents after a sorting process in the fourth embodiment of the present disclosure having been performed.

Such a process is repeated for the documents Da-1 to Da-10. Once the sorting process has been terminated, these documents D, D . . . are accumulated on the paper delivery trays 208-1 to 208-4 according to the size. The situation of the post-processing mechanism 200 at this time is shown in FIG. 18A. With reference to FIG. 14A and FIG. 14B, and FIG. 18A, since the documents Dd-1, Dd-2, Dd-4, Dd-7, and Dd-10 have the same length L, respectively, they are accumulated on the paper delivery tray 208-4. Since the documents Db-3, Dd-5, and Db-9 also have the same length L, respectively, they are accumulated on the paper delivery tray 208-2. However, the documents Db-6 and Dd-8 have lengths L that are different from those of the two ones that have been previously encountered, they are discharged onto the paper delivery tray 208-1 and the paper delivery tray 208-3, respectively.

In the above described fourth embodiment, as an example of the case where rewriting of the sorting destination information area 113*d* is effective, there is a case where it is known that, among the documents D, D . . . that are accommodated in the paper feeding cassette 161, there exist no documents having a length equal to or under 100 (mm), and thus it is desired that an empty stage be not produced on the upper stage side of the paper delivery trays 208, 208, . . . .

In other words, if a document having a small size (a document short in length) is discharged on the lower stage side of the paper delivery trays 208, 208, . . . , there may be caused such an inadvertent error as forgetting to takeout the document after the sorting process. Then, as shown in FIG. 18A, by discharging a small-size document to the delivery tray at the uppermost stage, such an inadvertent error can be avoided.

Contrarily, in the case where all the documents D, D . . . are first subjected to the sorting process as described above, and then immediately after the termination of the sorting process, printing of documents is performed as another process in the image forming part 150 to discharge them, if they are discharged on the lower stage side of the paper delivery trays 208, 208, . . . , there is the possibility that the printed documents may be mixed with the sorted documents. Then, in order to discharge the printed documents with no problem, by keeping the upper stage side of the paper delivery tray 208, 208, . . . vacated, such a mistake can be avoided. In such a case, a piece of information of a smaller value (or a value of length, such as 0, that is obvious to be non-existent as a length of document) can be written in the blank space on the upper side in the sorting destination information area 113*d*.

In the example shown in FIG. 14A and FIG. 14B, the smallest value of length L is 182 (mm). Then, as shown in FIG. 15, the piece of information that has been written in the length 113*d*-1 blank space in the sorting destination information area 113*d* being kept 100, the above-described processes at Steps Sd1-1 to Sd2, and Steps Sd21 to Sd43 are executed. Then, as shown in FIG. 18B, with the paper delivery tray 208-1 at the uppermost stage of the paper delivery trays 208, 208, . . . being vacated, the documents D, D . . . will be discharged to the paper delivery trays from 208-2 to 208-5.

Fifth Embodiment

Some MFPs can sense the thickness of a document that has been fed out from the paper feeding cassette. As described above, the present disclosure presupposes that the documents D, D . . . are sorted by various characteristics. In this fifth embodiment, in addition to sorting the documents by size, by utilizing a sensor being capable of sensing the thickness of a document, or the like, sorting can be performed in more detail.

FIG. 19 shows an example of configuration of an MFP 1*a* that is provided with a double feeding detection sensor. The post-processing mechanism 200 shown in FIG. 19 is the same as that shown in FIG. 1, and therefore, the explanation thereof will be omitted. Also for each part of the main body apparatus 100*a*, this policy of explanation is the same, and for the portion that is provided with the same symbol as that of a particular part shown in FIG. 1, explanation thereof will be omitted.

A carrying passage 170*a* shown in FIG. 19 has a double feeding detection sensor 174 in addition to the conveyance roller pairs 171, 171, . . . .

This double feeding detection sensor 174 detects double feeding (overlapping) of documents (paper sheets) on the basis of a transmission attenuation amount of an ultrasonic wave, or the like, and can also recognize the difference in thickness between documents.

In the fifth embodiment, a document D that has been fed out from the paper feeding cassette 161 is fed to the carrying passage 170a. When this document D is passed through the double feeding detection sensor 174, the thickness thereof is sensed, and if the document D is a document of a thin paper, such as a copying paper sheet, or the like (as an example, a copying paper sheet having a thickness of 0.08 mm or so is often used), a piece of information that gives TL is outputted as the thickness T thereof. On the other hand, if the document D is a document of a thick paper, such as a pamphlet paper sheet, or the like (as an example, a pamphlet paper sheet having a thickness of 0.13 mm or so is often used), a piece of information that gives TH is outputted as the thickness T thereof.

In the present embodiment, a case where documents with which each of two different paper sheet thicknesses is mixed with two different sizes are to be sorted by the characteristics will be explained.

With the paper feeding cassette 161 shown in FIG. 20A, the paper sheet guides 163-1 and 163-2, which are provided in the bottom part thereof, determine the paper sheet placement area width W. Between these paper sheet guide 163-1 and paper sheet guide 163-2, ten documents Db-1 to Db-10 having a width W are placed with one edge part of each of them being aligned with the location of the feeding end 161a.

FIG. 20B gives an example of detailed breakdown of the size and direction, and paper sheet thickness of these documents Db-1 to Db-10.

The size and direction of the respective documents De-1 to De-10 that are given in FIG. 20B are the same as the size and direction of the respective documents De-1 to De-10 that are given in FIG. 3B. However, the documents Da-2, Da-3, and Da-6 are of a thin paper (TL), and the others are of a thick paper (TH).

Here, the contents that are recorded in the memory 113 in the present embodiment will be explained. FIG. 21A gives a relationship between the address and the data for the memory 113. In FIG. 21A, the relationship between a particular area and the location is indicated with a logical address, and therefore, the size (for example, the number of bytes) of data for one unit of address varies depending upon the content. In addition, in case where the physical addresses (not given in FIG. 21A) are investigated, a set of data (for example, the values of length for the standard sizes) may be distributed in a plurality of physical address areas that are not continued.

In the memory 113, there are provided, for example, a program area 113a (the logical addresses thereof being x000 to x009) for recording a program for the MFP 1 to control the operation; a various setting information area 113b (the logical addresses thereof being x010 to x019) for recording the environmental information for use of the image forming apparatus of the present disclosure as an MFP (the installation region, the FAX number, the sizes of recording papers to be accommodated, the setting of the back light in the operation part 130, and the like); and an image data area 113c (the logical addresses thereof being x020 to x029) for rearranging or temporary storage of image data.

In addition to this, the memory 113 is provided with a sorting destination information area 113f (the logical addresses thereof being x030 to x039).

The type 113f-1 blank space, the type 113f-2 blank space, . . . , and the type 113f-10 blank space in the sorting destination information area 113f correspond to the respective paper delivery trays 208-1, 208-2, . . . , and 208-10, and in these blank spaces, pieces of information about thickness and length are written in as the sorting conditions for the documents to be sorted to the respective paper delivery trays 208, . . . .

In addition, in FIG. 21A, the area below the sorting destination information area 113f (the logical addresses thereof being x040 and the subsequent) is provided for still another purpose. However, the explanation thereof will be omitted here. In addition, FIG. 21B will be described later.

In the present embodiment, assuming that, for each of the two different paper sheet thicknesses, two different sizes are to be sorted (four types are to be sorted in total), the thickness and the length as the sorting conditions are written in the type 113f-1 blank space to the type 113f-4 blank space that correspond to the paper delivery trays 208-1 to 208-4 (in the subsequent blank spaces, "☐☐☐" meaning a blank space is kept as being given).

This sorting conditions will be explained more specifically. The thickness TL indicates that the thickness T of the document D that is provided as a result of sensing by the double feeding detection sensor 174 is of a thin paper. On the other hand, the thickness TH indicates that the thickness T of the document D that is provided in the same manner is of a thick paper. In addition, "300 (or under)" in the length blank space indicates that the length L of the document D is 300 (mm) or under, and "Z" indicates that the length L of the document D exceeds 300 (mm).

In the fifth embodiment, the pieces of information in the respective blank spaces in the sorting destination information area 113f are previously set as initial values when, as one example, the MFP 1 is provided with a document sorting function as an optional. Therefore, they are not to be successively rewritten during the sorting process or the printing process involving sorting.

However, at the time of the sorting process, the user of the MFP 1 can temporarily rearrange the sorting conditions in the type 113f-1 blank space to the type 113f-10 blank space (except for the blank spaces of "☐☐☐").

For example, according to the arrangement of the sorting conditions in the respective blank spaces in the sorting destination information area 113f shown in FIG. 21A, the documents D, D . . . are sorted to the paper delivery tray 208-1, 208-2, . . . , 208-10 on a thickness-priority basis.

Then, if, at the time of starting the sorting process, or the like, the user has given a request for giving a priority to the length, the main body control part 110 rearranges the sorting conditions in the respective blank spaces in the sorting destination information area 113f such that a priority is given to the length. For example, if the sorting conditions in the respective blank spaces are rearranged as given in the respective blank spaces in the sorting destination information area 113f shown in FIG. 21B, the documents D, D . . . are sorted to the paper delivery tray 208-1, 208-2, . . . , 208-10 on a length-priority basis.

Figure 22:
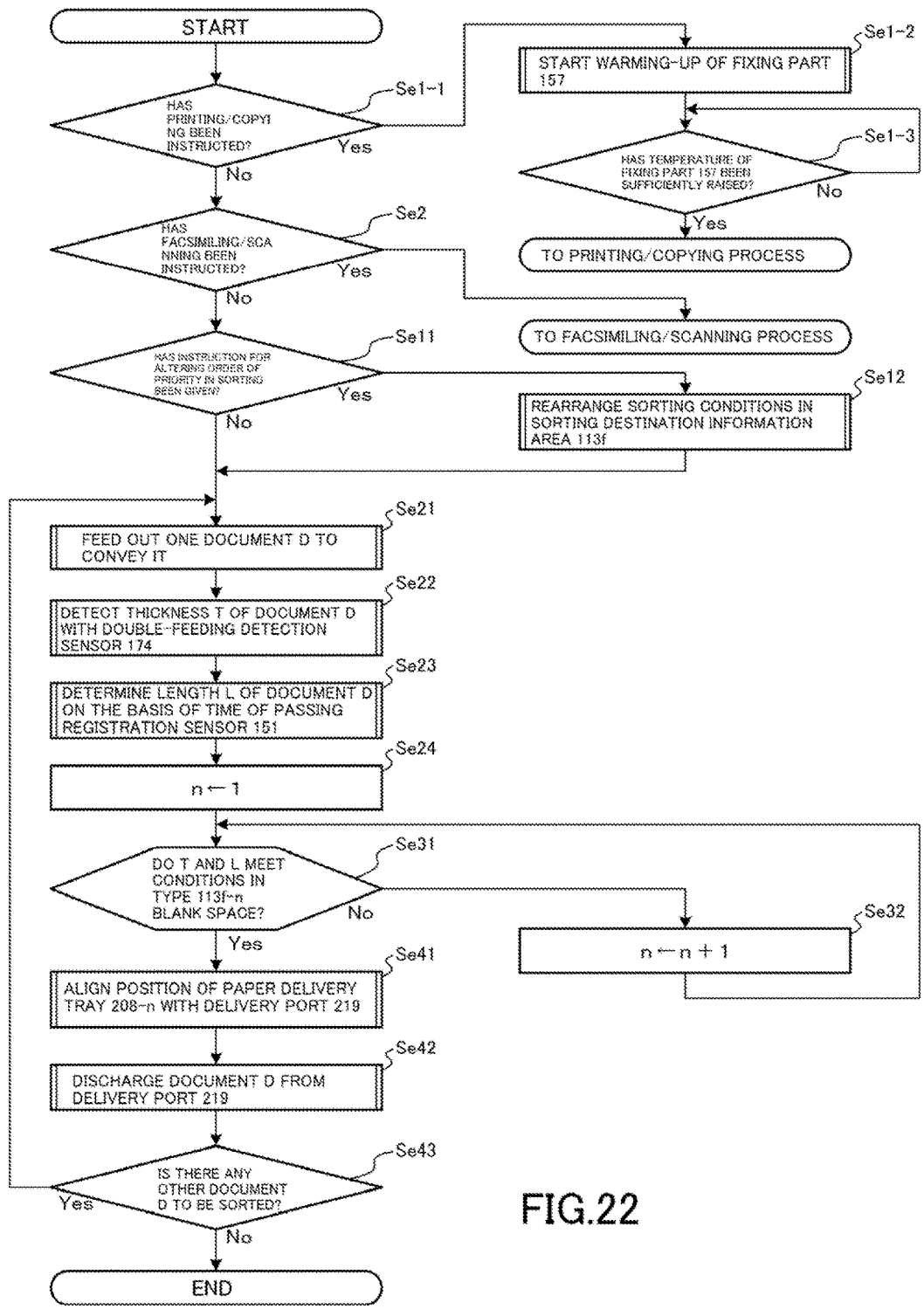
FIG. 22 is a flowchart illustrating the flow of processing in the fifth embodiment of the present disclosure.

The procedure for processing in the fifth embodiment will be specifically explained with reference to FIG. 22. In the fifth embodiment, as shown in FIG. 20A and FIG. 20B, the documents Da-1 to Da-10 having different sizes and thicknesses are accommodated in the paper feeding cassette 161 (161-1 or 161-2). Then, when the process is instructed to be started by means of the "start key" (see FIG. 2) that is disposed in the keyboard 132, or the like, the operation is started.

At Step Se1-1, the flow of the processing by the main body control part 110 varies depending upon whether or not the process that has been instructed to be started is either "printing" or "copying".

Here, in the case where start of either "printing" or "copying" has been instructed, the main body control part 110 starts warming up of the fixing part 157 at Step Se1-2. At the same time, the main body control part 110 waits until the temperature of the fixing part 157 is sufficiently raised (Step Se1-3).

In this way, with general MFPs (including printers and copying machines), a downtime exceeding a definite period of time will be introduced for electric power saving, or the like. Then, with quite a few MFPs, thereafter, even if the main body control part 110 attempts to execute either "printing" or "copying", it will be forced to wait until the preparation operations, including cleaning and warming up of the respective components related to printing, such as the recording part, are completed.

However, the process according to the present disclosure is independent of such a process that involves waiting. Therefore, the process proceeds to the next step.

At the next Step Se2, the flow of the processing by the main body control part 110 varies depending upon whether or not the process that has been instructed to be started is either "facsimiling" or "scanning".

Besides this, with some MFPs, and the like, inside maintenance or self-diagnosis can also be instructed to be started through the operation of the keyboard 132, or the like. However, in the present embodiment, for explanation, it is assumed that the process to be instructed besides "printing", "copying", "facsimiling" and "scanning" is limited to "sorting".

The main body control part 110 confirms whether or not the user of the MFP 1 has given an instruction for altering the above-described order of priority in sorting (Step Se11) prior to the sorting process. If there has been a request, the respective blank spaces in the sorting destination information area 113*f* are rearranged (Step Se12).

The details of operation of inputting such an instruction and that of rearranging the contents of the memory 113 are general ones. Therefore, explanation thereof will be omitted here.

As the sorting process, the main body control part 110 first feeds out one document D from the paper feeding cassette 161 to feed it to the carrying passage 170 (Step Se21). When the document D has been fed to the carrying passage 170, the double feeding detection sensor 174 senses the thickness T of the document D (Step Se22). In addition, the time required for this document D to pass through the registration sensor 151 is measured. As described above, the amount of rotation of the registration roller pair 172 can be exactly grasped. Thus, from the time required for the document D to pass, the length L of the document D is calculated (Step Se23).

Here, the value of n, which indicates that the thickness T and the length L are to be compared with the thickness T and the length L in the nth length 113*f* blank space, is set at 1 (Step Se24).

At the next step, the main body control part 110 confirms whether or not the thickness T and the length L meet the sorting conditions in the type 113*f*-*n* blank space (Step Se31). If the conditions are not met, 1 is added to the value of n, and the process is returned to Step Se31.

On the other hand, in the case where, at Step Se31, the thickness T and the length L meet the sorting conditions in the type 113*f*-*n* blank space, the main body control part 110 uses the elevating mechanism 220 in the post-processing mechanism 200 to align the position of the paper delivery tray 208-*n* with the delivery port 219 (Step Se41). Simultaneously with this, this document D is fed to the post-processing mechanism 200 through the paper discharging rollers 182*b*, after having been passed through the image forming part 150. The post-processing mechanism 200 discharges the document D to the paper delivery tray 208-*n* through the delivery port 219, after having caused it to pass through the stock part 210 (Step Se42).

After the document D having been discharged from the delivery port 219, the main body control part 110 terminates the process, if there is no other document D to be sorted in the paper feeding cassette 161. On the other hand, if there is a document D (Step Se43), the process is returned to Step Se21, and then, next one document D is fed out, being fed to the carrying passage 170.

Such a process is repeated for the documents Da-1 to Da-10. Once the sorting process has been terminated, these documents D, D . . . are accumulated on the paper delivery trays 208-1 to 208-4 according to the thickness T and the Length L. The situation of the post-processing mechanism 200 at this time is shown in FIG. 23A and FIG. 23B.

With reference to FIG. 20A and FIG. 20B, and FIG. 23A, the document De-3, which is of a thin paper, is discharged to the paper delivery tray 208-1, while the document De-2 and the document De-6, which are different in length L therefrom, are accumulated on the paper delivery tray 208-2.

In addition, the documents De-5, De-8, and De-9, which are of a thick paper, are accumulated on the paper delivery tray 208-3. The documents De-1, De-4, De-7, and De-10, which are different in length L from these, are accumulated on the paper delivery tray 208-4 (which is the sorting on a thickness-priority basis).

On the other hand, with reference to FIG. 20A and FIG. 20B, and FIG. 23B, the document De-3, which is 300 (mm) or under in length L, is discharged to the paper delivery tray 208-1. The documents De-5, De-8, and De-9, which are different in thickness T therefrom, are accumulated on the paper delivery tray 208-2.

In addition, the documents De-2 and De-6, which is over 300 (mm) in length L, are accumulated on the paper delivery tray 208-3. The documents De-1, De-4, De-7, and De-10, which are different in thickness T from these, are accumulated on the paper delivery tray 208-4 (the sorting on a length-priority basis).

As explained above, according to each embodiment of the present disclosure, a bundle of documents that have been already printed can be sorted by the characteristics of each one of the documents with no need for adding a sensor, or the like, to an image forming apparatus, such as an MFP, or the like.

In addition, the present disclosure not only eliminates the need for waiting until the warming up, and the like, of the fixing part are completed, but also allows providing a configuration in which sorting of the documents is performed in accordance with the waiting time period, whereby the user can effectively use the image forming apparatus.

Further, sorting is performed depending upon whether the size of the document belongs to either one of the previously stored two different sizes or to a size other than those (the second embodiment); and the designation of the size can be displayed (the third embodiment), whereby the user can easily grasp the size of each document that has been sorted.

Or, the reference of dimension in sorting can be inputted in detail, and to the proper sorting destination among the plurality of paper delivery trays, the documents can be discharged and accumulated (the fourth embodiment). By adding the thickness of the document as the reference in sorting (the fifth embodiment), the image forming apparatus can be used further efficiently.

However, with a typical technique, even if it is intended to sort the documents on which an image has been formed at the time of printing, it is difficult to sort a bundle of documents by paper sheet size in the case where the documents are of different paper sheet sizes, having been already printed, and are irregularly mixed, for example.

In addition, generally, many of the copying machines and MFPs require the preparation process for the printing function in printing, thereby the time required for the preparation process being wasted.

The present disclosure is not limited to the above-described embodiments, and it is obvious that they can be altered in appropriate ways within the scope of the technical concept of the present disclosure.

Of course, any image forming apparatus that combines some of the above-described features, and any piece of electronic equipment or sorting method, or the like, that applies an image forming apparatus that has the above-described features are also within the scope of the present disclosure.

What is claimed is:

1. An image forming apparatus, comprising:
a paper feeding part that accommodates a plurality of documents,
a registration roller pair that conveys a document fed out from the paper feeding part to an image forming part at a specified speed,
a first detecting part for detecting the pass of an edge part of the document immediately before being conveyed to the image forming part,
a paper discharging part that discharges the document conveyed after having passed the image forming part,
a plurality of paper delivery trays that accumulate the document discharged to the paper discharging part,
a storing part for storing a piece of characteristic information related to the document that is accumulated on each of the plurality of paper delivery trays,
a moving part for moving any one of the plurality of paper delivery trays or all of the plurality of paper delivery trays to a specified position,
a control part that controls the moving part,
an inputting part for inputting various numerical values or various instruction commands to the control part, and
an image forming part that includes a fixing part to fix a toner image on a printing paper sheet fed from the paper feeding part,
the control part
determining a length of the document in a direction of conveyance from the time required from the moment when the document conveyed at the specified speed has reached the first detecting part to the moment when the document passes the first detecting part,
determining any one of the plurality of paper delivery trays as a sorting destination on the basis of the length of each of the plurality of documents along the direction of conveyance, and the piece of characteristic information that has been previously stored in the storing part or otherwise is stored in a successive manner, and
moving the paper delivery tray as the sorting destination to a position opposed to the paper discharging part;
wherein
the image forming part
includes a processing part that uses a preparation period from the moment when a process starting instruction has been inputted by the inputting part to the moment when an image becomes capable of being formed,
the control part, even during the preparation period, conveys the document to the image forming part,
the control part accumulates the document on the paper delivery tray as the sorting destination;
there is provided a second detecting part for detecting a thickness of the document conveyed to the image forming part,
the control part
further determines the paper delivery tray as the sorting destination on the basis of the thickness of the document,
moves the paper delivery tray as the sorting destination to a position opposed to the paper discharging part, and
by receiving an instruction from the inputting part, specifies whether a priority is to be given to sorting by the length of the document along the direction of conveyance or a priority is to be given to sorting by the thickness of the document;
the image forming apparatus is configured such that, when printing, warming up of the fixing part is performed, a toner image is formed on the printing paper sheet by the image forming part after the fixing part is warmed up, the toner image formed on the printing paper sheet is fixed by the fixing part, and thereafter, the printing paper sheet on which the toner image is fixed is discharged onto the paper delivery tray;
the image forming apparatus is configured such that, in the sorting process, warming up of the fixing part is not performed, and, instead of the printing paper sheet, a document that is to be sorted is fed from the paper feeding part;
the image forming apparatus is configured such that, when an instruction for sorting documents on a length-priority basis has been given, documents which are different in thickness therefrom are respectively discharged to different paper delivery tray for every length of the documents, and when an instruction for sorting documents on a thickness-priority basis has been given, documents which are different in length therefrom are respectively discharged to different paper delivery tray for every thickness of the documents; and
the image forming apparatus is configured such that pieces of information indicating sorting conditions about thickness and length of the documents to be sorted are stored in the storing part for every paper delivery tray, and then a document having thickness or length corresponding to the pieces of information is discharged to the paper delivery tray according to the sorting condition.

2. A sorting method, being used with an image forming apparatus including:
a paper feeding part that accommodates a plurality of documents,
a registration roller pair that conveys a document fed out from the paper feeding part to an image forming part at a specified speed,
a first detecting part for detecting the pass of an edge part of the document immediately before being conveyed to the image forming part,
a paper discharging part that discharges the document conveyed after having passed the image forming part,
a plurality of paper delivery trays that accumulate the document discharged to the paper discharging part,
a storing part for storing a piece of characteristic information related to the document that is accumulated on each of the plurality of paper delivery trays, a moving part for moving any one of the plurality of paper delivery trays or all of the plurality of paper delivery trays to a specified position,
a control part that controls the moving part,
an inputting part for inputting various numerical values or various instruction commands to the control part, and
an image forming part that includes a fixing part to fix a toner image on a printing paper sheet fed from the paper feeding part,
comprising:
a first step of determining a length of the document along the direction of conveyance from the time required from the moment when the document conveyed at the specified speed has reached the first detecting part to the moment when the document passes the first detecting part,
a second step of specifying the sorting destination of the document on the basis of the length of each of the plurality of documents along the direction of conveyance, and the piece of characteristic information that has been previously stored in the storing part or otherwise is stored in a successive manner, and
a third step of moving the paper delivery tray as the sorting destination of the document that has been specified in the second step to a position opposed to the paper discharging part, and
a fourth step of discharging the document from the paper discharging part;
wherein
the image forming apparatus includes a processing part that uses a preparation period from the moment when a process starting instruction has been inputted by the inputting part to the moment when an image becomes capable of being formed, wherein
the control part, even during the preparation period, conveys the document to the image forming part,
the control part accumulates the document on the paper delivery tray as the sorting destination,
the an image forming apparatus includes a second detecting part for detecting a thickness of the document conveyed to the image forming part,
the second step comprises further specifying the paper delivery tray as the sorting destination on the basis of the thickness of the document,
the method comprises a step of rearranging the contents of the corresponding portion of the characteristic information that has been stored in the storing part such that, on the basis of an instruction input that has been received from the inputting part prior to the first step, there is provided an order of priority that gives a priority to sorting by the length of the document along the direction of conveyance or a priority to sorting by the thickness of the document,
when printing, warming up of the fixing part is performed, a toner image is formed on the printing paper sheet by the image forming part after the fixing part is warmed up, the toner image formed on the printing paper sheet is fixed by the fixing part, and thereafter, the printing paper sheet on which the toner image is fixed is discharged onto the paper delivery tray,
in the sorting process, warming up of the fixing part is not performed, and, instead of the printing paper sheet, a document that is to be sorted is fed from the paper feeding part,
when an instruction for sorting documents on a length-priority basis has been given, documents which are different in thickness therefrom are respectively discharged to different paper delivery tray for every length of the documents, and when an instruction for sorting documents on a thickness-priority basis has been given, documents which are different in length therefrom are respectively discharged to different paper delivery tray for every thickness of the documents, and
pieces of information indicating sorting conditions about thickness and length of the documents to be sorted are stored in the storing part for every paper delivery tray, and then, a document having thickness or length corresponding to the pieces of information is discharged to the paper delivery tray according to the sorting condition.

* * * * *